United States Patent [19]

Hansen et al.

[11] Patent Number: 5,787,240
[45] Date of Patent: Jul. 28, 1998

[54] PRINTER CONTROL APPARATUS CONVERTING VIDEO DATA FROM AN EXTERNAL HOST TO VIDEO DATA FOR A PRINTER

[75] Inventors: Igor Hansen, West Lothian, United Kingdom; Keiji Fujiwara, Kato-gun, Japan; Shinichi Takahashi, Kawasaki, Japan; Atsushi Miki; Satoshi Fukui, both of Kato-gun, Japan

[73] Assignees: Fujitsu Ltd., Japan; Clan Systems Ltd., United Kingdom

[21] Appl. No.: 382,540

[22] Filed: Feb. 2, 1995

[30] Foreign Application Priority Data

May 20, 1994 [EP] European Pat. Off. ............ 94303651

[51] Int. Cl.⁶ .................................................. G06K 15/00
[52] U.S. Cl. ................ 395/115; 395/116; 395/508; 395/521; 395/482; 395/433; 395/495; 358/404
[58] Field of Search .................................. 395/115, 116, 395/101, 164, 165, 166, 163, 162, 114, 508, 521, 481, 482, 427, 433, 511, 516, 287, 289, 290, 297, 298, 494, 495; 358/404, 444

[56] References Cited

U.S. PATENT DOCUMENTS

| | | | |
|---|---|---|---|
| 4,615,018 | 9/1986 | Sakano | 364/900 |
| 5,001,653 | 3/1991 | Buchanan et al. | 364/523 |
| 5,056,041 | 10/1991 | Guttag et al. | 395/164 |
| 5,297,271 | 3/1994 | Bhayani | 395/482 |
| 5,511,152 | 4/1996 | Lai et al. | 395/115 |
| 5,530,792 | 6/1996 | Ikeda et al. | 395/115 |

FOREIGN PATENT DOCUMENTS

| | | |
|---|---|---|
| 0 458 304 | 11/1991 | European Pat. Off. . |
| 0 556 994 | 8/1993 | European Pat. Off. . |
| 55-049787 | 4/1980 | Japan . |
| 56-166535 | 12/1981 | Japan . |
| 57-075347 | 5/1982 | Japan . |
| 58-142840 | 8/1983 | Japan . |
| 59-133626 | 8/1984 | Japan . |
| 60-136824 | 7/1985 | Japan . |
| 61-131119 | 6/1986 | Japan . |
| 62-164548 | 7/1987 | Japan . |
| 62-173526 | 7/1987 | Japan . |
| 63-024368 | 2/1988 | Japan . |
| 63-061287 | 3/1988 | Japan . |
| 63-086017 | 4/1988 | Japan . |
| 63-256450 | 10/1988 | Japan . |
| 64-054552 | 3/1989 | Japan . |
| 1-185408 | 7/1989 | Japan . |
| 2-310645 | 12/1990 | Japan . |
| 3-104666 | 5/1991 | Japan . |
| 3-133672 | 6/1991 | Japan . |
| 4-201471 | 7/1992 | Japan . |
| 4-291572 | 10/1992 | Japan . |
| 4-345871 | 12/1992 | Japan . |

*Primary Examiner*—Dwayne Bost
*Assistant Examiner*—Tracy M. Legree
*Attorney, Agent, or Firm*—Staas & Halsey

[57] ABSTRACT

A printer control apparatus provided with a CPU for converting video data supplied from an external unit to video data tailored to the operation of the printer; a memory holding various types of data during that conversion processing; and a read/write control unit performing the read/write control of the data between the memory, CPU, and the printer, which includes latch units which respectively latch the address and data from the CPU and thereby perform the processing at the minimum bus cycle. Also, the upper bit side of that address is made to include the control data from the CPU, and an autonomous read/write control is carried out. Further, that read/write control is carried out while using the video buffer comprising several standard size pages and by freely using that page.

23 Claims, 37 Drawing Sheets

Fig.9

|   | A31 | A28 | A27 | R/W | FUNCTION |
|---|-----|-----|-----|-----|----------|
| i | 0 | × | × | 1 | NORMAL READ |
| ii | 0 | × | × | 0 | NORMAL WRITE |
| iii | 1 | 1 | 0 | 1 | FLYBY READ |
| iv | 1 | 0 | × | 1 | FLYBY WRITE |
| v | 1 | 1 | 1 | 1 | FLYBY READ MODIFY WRITE |

Fig.10

|   | A30 | A29 | FUNCTION |
|---|-----|-----|----------|
| i | 0 | 0 | CONTINUATION OF VIDEO DATA TRANFER |
| ii | 0 | 1 | END OF LINE, WAITING FOR NEXT HORIZONTAL SYNCHRONIZING SIGNAL (HS) |
| iii | 1 | 0 | END OF LINE, END OF VIDEO BUFFER, COUNT UP OF COUNTER |
| iv | 1 | 1 | END OF LINE, END OF PAGE, FINISH OF VIDEO TRANSFER |

Fig. 28

| FROM WRITE ID REGISTER 114 | | | | VIDEO BUFFER 21 TO BE SELECTED |
|---|---|---|---|---|
| WID3 | WID2 | WID1 | WID0 | |
| 0 | 0 | 0 | 0 | ID = 0 |
| 0 | 0 | 0 | 1 | ID = 1 |
| 0 | 0 | 1 | 0 | ID = 2 |
| 0 | 0 | 1 | 1 | ID = 3 |
| 0 | 1 | 0 | 0 | ID = 4 |
| 0 | 1 | 0 | 1 | ID = 5 |
| 0 | 1 | 1 | 0 | ID = 6 |
| 0 | 1 | 1 | 1 | ID = 7 |
| 1 | 0 | 0 | 0 | ID = 8 |
| 1 | 0 | 0 | 1 | ID = 9 |
| 1 | 0 | 1 | 0 | ID = 10 |
| 1 | 0 | 1 | 1 | ID = 11 |
| 1 | 1 | 0 | 0 | ID = 12 |
| 1 | 1 | 0 | 1 | ID = 13 |
| 1 | 1 | 1 | 0 | ID = 14 |
| 1 | 1 | 1 | 1 | ID = 15 |

Fig.30

| FROM READ-OUT MEMORY 110 | | | | VIDEO BUFFER 21 TO BE SELECTED |
|---|---|---|---|---|
| RID3 | RID2 | RID1 | RID0 | |
| 0 | 0 | 0 | 0 | ID = 0 |
| 0 | 0 | 0 | 1 | ID = 1 |
| 0 | 0 | 1 | 0 | ID = 2 |
| 0 | 0 | 1 | 1 | ID = 3 |
| 0 | 1 | 0 | 0 | ID = 4 |
| 0 | 1 | 0 | 1 | ID = 5 |
| 0 | 1 | 1 | 0 | ID = 6 |
| 0 | 1 | 1 | 1 | ID = 7 |
| 1 | 0 | 0 | 0 | ID = 8 |
| 1 | 0 | 0 | 1 | ID = 9 |
| 1 | 0 | 1 | 0 | ID = 10 |
| 1 | 0 | 1 | 1 | ID = 11 |
| 1 | 1 | 0 | 0 | ID = 12 |
| 1 | 1 | 0 | 1 | ID = 13 |
| 1 | 1 | 1 | 0 | ID = 14 |
| 1 | 1 | 1 | 1 | ID = 15 |

5,787,240

PRINTER CONTROL APPARATUS CONVERTING VIDEO DATA FROM AN EXTERNAL HOST TO VIDEO DATA FOR A PRINTER

BACKGROUND OF THE INVENTION

1. Field of the Invention

The present invention relates to data processing apparatus, for example for controlling a printer which can print a large volume of video data at high speed.

A printer control apparatus performs a processing function for converting video data (printing data), for example supplied from an external host etc., to video data suitable for use by a printer.

In recent years, demands on the performance of such printers have been rising. It is desirable to keep down the cost of a high resolution printer, for example a high-speed colour printer.

2. Description of the Related Art

As will be explained in more detail later with reference to the accompanying drawings, when a previously-considered printer control apparatus is used, operating speed is limited by a data setup time associated with a memory of the apparatus. Higher-speed memories, having shorter data setup times, tend to be expensive.

Using a slower memory, sufficient data setup time can be achieved by inserting additional wait cycles in a series of bus cycles defining the operational timing of a central processing unit of the apparatus, but this reduces the overall operational speed of the apparatus.

A problem similar to the above-described wait cycle may also occur because of the structure of the memory per se. There may be various types of memories in a printer control apparatus, one of which may be a video buffer. This acts as a buffer when outputting video data produced by the central processing unit to the printer. The function is extremely simple. In a case where the size of the page to be printed changes, where front-back printing is carried out on each of the pages, or where usual video data and a form-overlay are to be combined, the printing efficiency may be lowered considerably.

SUMMARY OF THE INVENTION

An object of the present invention is to achieve high operating speed by having a read/write control means in a printer control apparatus perform autonomously the above-described read/write control, without going through a central processing unit.

Another object is to include a data latch unit and an address latch unit, for latching the data and the address thereof in a latter half of a first bus cycle of the central processing unit and for completing the writing of the data by means of these latched data and address in a first half of a second bus cycle immediately succeeding the first bus cycle.

Still another object is to provide a central processing unit which adds control data, as additional upper bits, to address data delivered thereby, which control data can cause read/write functions to be performed autonomously, without any instruction from the central processing unit.

Further object is to provide a video buffer in printer control apparatus constituted by a memory able to store several standard size pages, any page of which may be selected at random so that video data therein is output to the printer.

To achieve the above-described objects, according to the present invention, a provision is made of a CPU for converting video data supplied from an external unit to video data tailored to the operation of the printer; a memory holding various types of data during that conversion processing; and a read/write control unit performing the read/write control of the data between the memory, CPU, and the printer, which includes latch units which respectively latch the address and data from the CPU and thereby perform the processing at the minimum bus cycle. Also, the upper bit side of that address is made to include the control data from the CPU, and an autonomous read/write control is carried out. Further, that read/write control is carried out while using the video buffer comprising several standard size pages and by freely using that page.

BRIEF DESCRIPTION OF THE DRAWINGS

The above object and features of the present invention will be more apparent from the following description of the preferred embodiments with reference to the accompanying drawings, wherein:

FIG. 9 is a table showing control data employed in the apparatus of FIG. 5;

FIG. 10 is a table showing further control data employed in the apparatus of FIG. 5;

FIG. 28 is a table of input data given to the circuit of FIG. 27;

FIG. 30 is a table of input data given to the circuit of FIG. 29;

DESCRIPTION OF THE PREFERRED EMBODIMENTS

Before describing the embodiments of the present invention, the related art and the disadvantages therein will be described with reference to the related figures.

Figure 1:
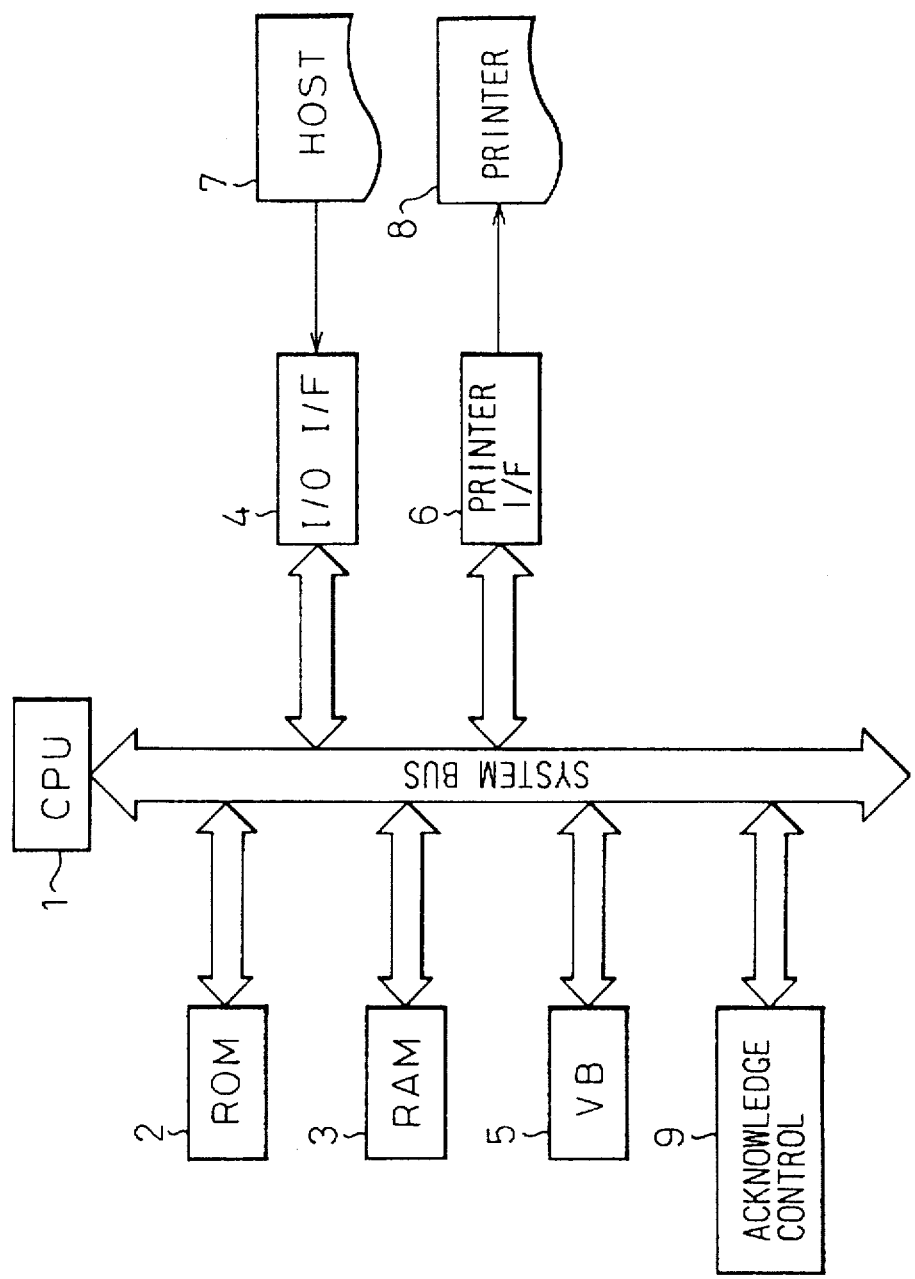
FIG. 1 is a schematic diagram of a previously-considered printer control apparatus.

FIG. 1 is a schematic diagram of a previously considered printer control apparatus, wherein a central processing unit (CPU) 1 handles the overall control; a read-only memory (ROM) 2 stores a control program, fonts, etc.; a random access memory (RAM) 3 includes a work area and an area used when video data given from an external unit is developed to image data; an input/output interface (I/O.I/F) is provided; a video buffer 5 stores image data developed in the RAM 3; and a printer interface (printer I/F) 6 is connected between a system bus and a printer 8. A host (including a hard disk drive HDD, a floppy disk drive FDD, a console panel, etc.) 7 is connected to the system bus via the interface 4. A printer 8 is connected to the system bus via the printer I/F 6. An acknowledge control unit 9 returns a transfer acknowledge signal (TA) to the CPU 1 whenever the CPU 1 outputs a transfer start signal (TS) and at the end of one bus cycle of the CPU 1.

Video data (printing data), input via the I/O interface 4, is decoded by the CPU 1 and the converted data is stored in RAM 3 as image data. This stored video data (image data) is transferred from the RAM 3, via the CPU 1, to the video buffer 5. The RAM 3 is cleared by the CPU 1 so as to open an area for the video data (image data) to be input next. This clearing is achieved by writing data "0" into the RAM 3. The video data stored in the video buffer 5 is read out at a required transfer timing of the printer 8, passes through the printer I/F 6, and is then transferred to the printer 8.

Figure 2:
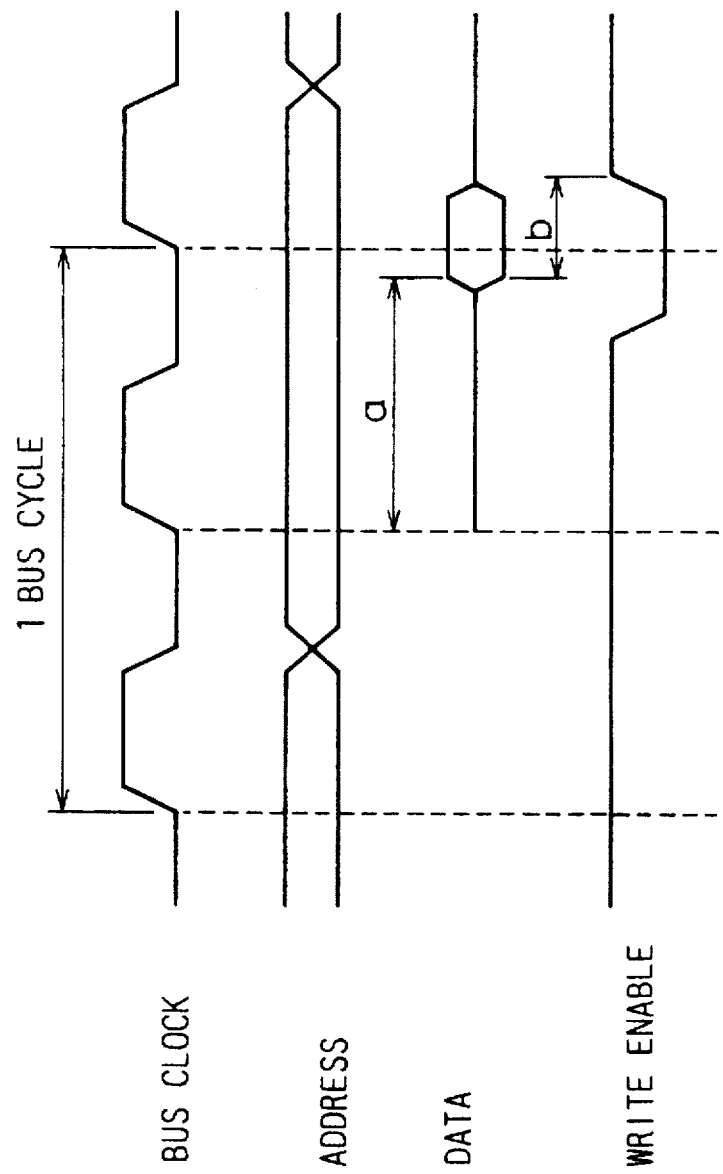
FIG. 2 is a timing diagram.

In the data transfer from the CPU 1 to the RAM 3, the operational speed is limited by the fact that the data cannot be fixed before a data fixing time a (FIG. 2) has elapsed. Also, that data cannot be written in the memory before a data setup period b has elapsed.

Figure 3:
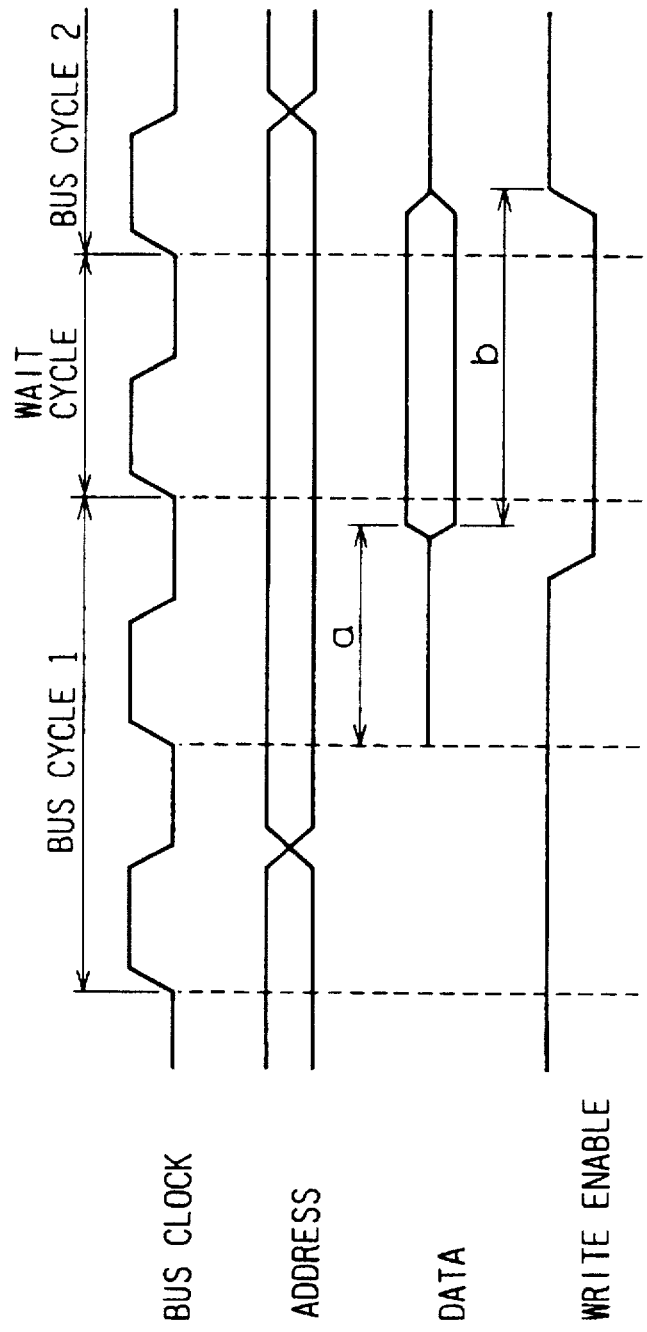
FIG. 3 is a timing diagram illustrating a wait cycle.

A method of inserting a wait cycle between one bus cycle and another bus cycle as previously mentioned is illustrated in FIG. 3, but the introduction of such wait cycles obviously reduces the overall operating speed, as would the simpler step of lowering the operational frequency of the CPU 1 (extending the bus cycle).

Figure 4:
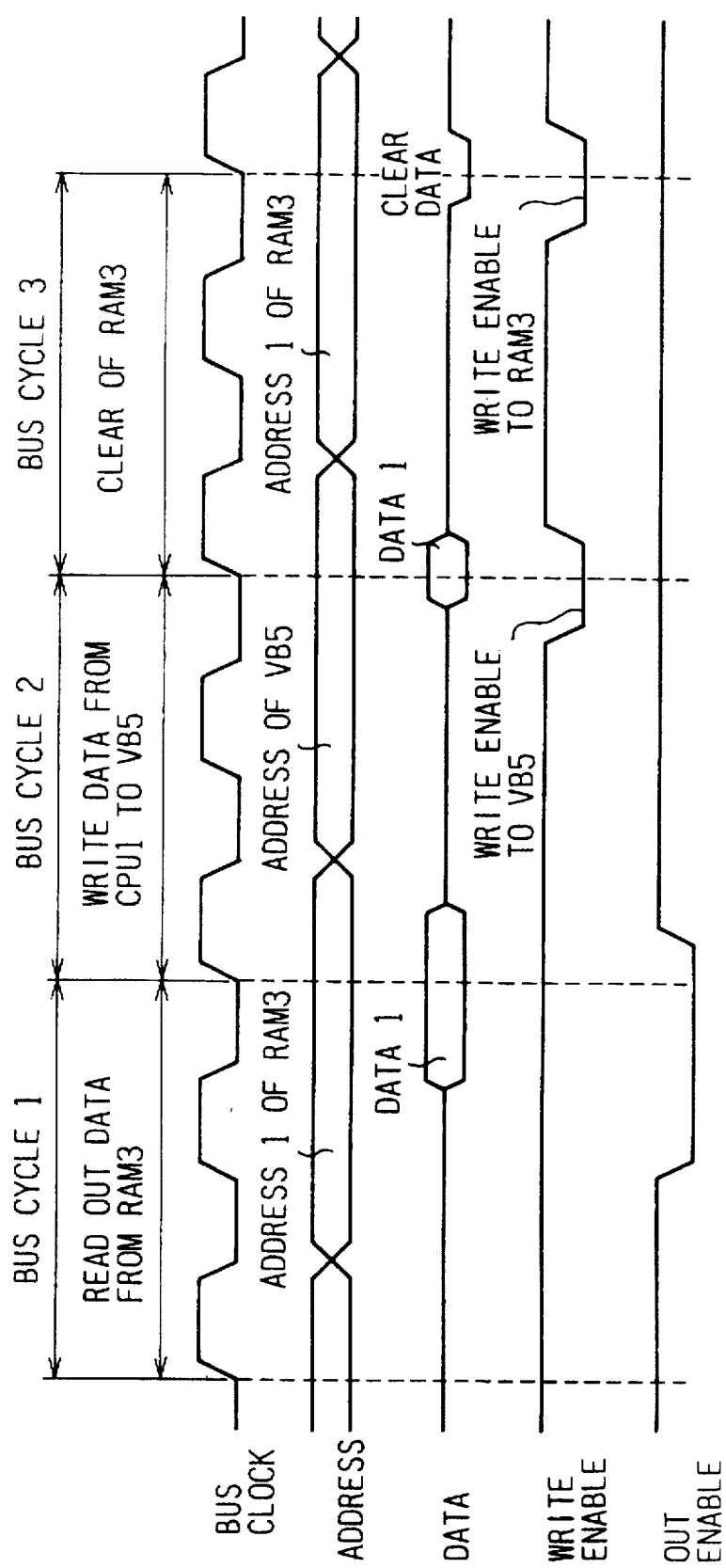
FIG. 4 is a timing diagram illustrating data transfer timing in the apparatus of FIG. 1.

FIG. 4 illustrates operational timing in the previously considered apparatus of FIG. 1. Data transfer from the RAM 3 of FIG. 1 to the video buffer 5 requires a read out of data from the RAM 3 to the CPU 1 (bus cycle 1), writing of the data from the CPU 1 to the video buffer (VB) 5 (bus cycle 2), and writing of the clear data (data "0") from the CPU 1 to the RAM 3 (bus cycle 3). When these operations are performed sequentially, three consecutive bus cycles are necessary. Note that, in FIG. 4, the two "ADDRESS 1 OF RAM 3" in the address row relate to the same address. "WRITE ENABLE" is a signal given from the CPU 1 so as to bring the video buffer 5 and the RAM 3 to respective write enable states. "OUT ENABLE" is a read enable signal for the RAM 3.

To reduce the number of successive bus cycles needed for such data transfer, a direct memory access (DMA) control circuit could be added to the internal printer control apparatus, enabling DMA transfer to be carried out from the RAM 3 to the video buffer 5 in two consecutive bus cycles, but the DMA control circuit can increase the complexity and cost of the apparatus to an unacceptable extent.

In data transfer from the video buffer 5 to the printer 8, the end of a line and the end of a page can be detected by counting the number of picture dots and the number of lines, respectively. For this purpose, the page sizes must be set. If sheets of different sizes are to be printed, respective different page sizes will need to be set appropriately, reducing the flexibility and speed with which differing page sizes can be handled. Moreover, the load on the CPU is increased.

For example, when a form overlay is used, it may be necessary to differentiate the area of the video buffer 5 from the areas for the form overlay and for normal printing-image data, and to provide address latches and address counters. If the number of form overlays and the number of printing sheets are changed, the video buffer area cannot be flexibly selected, and effective utilization of the memory cannot be achieved.

Figure 5:
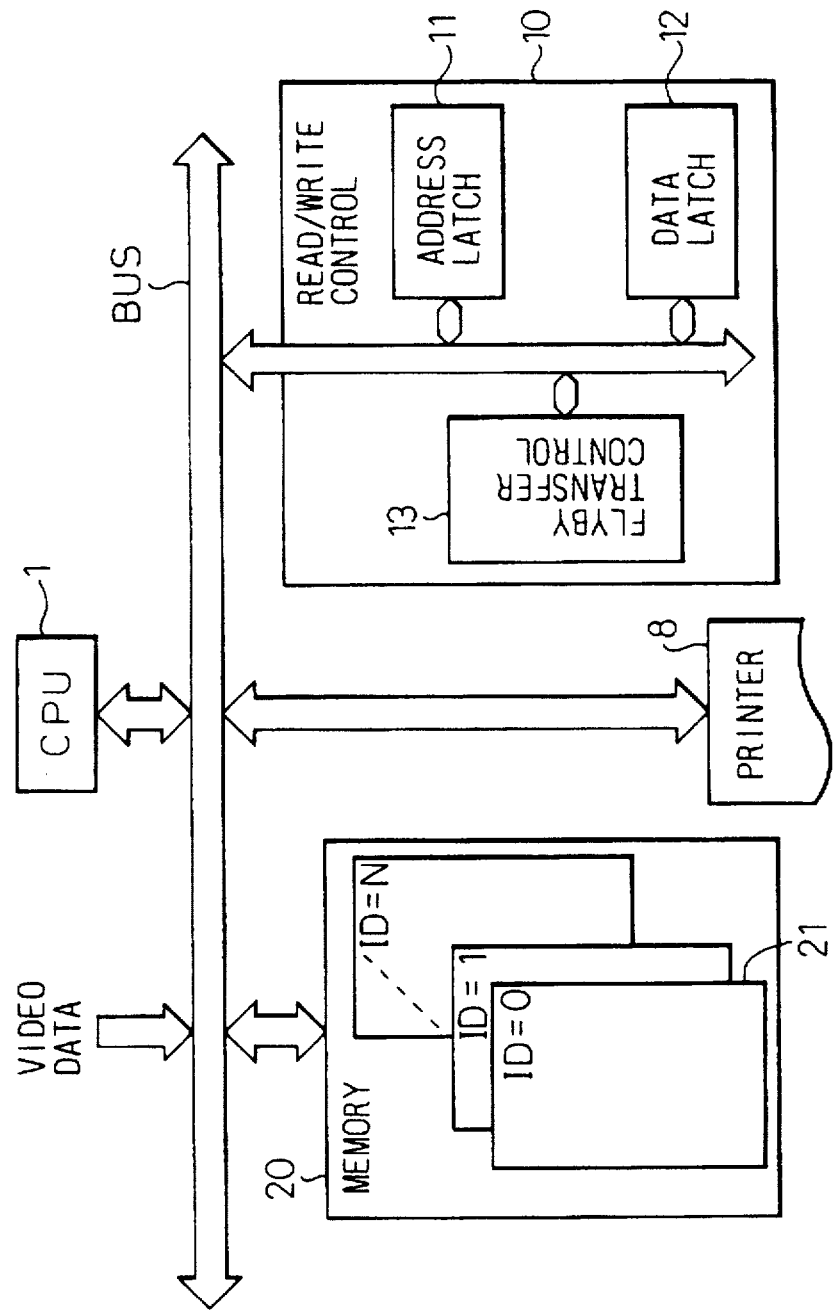
FIG. 5 is a schematic diagram of a printer control apparatus embodying the present invention.

The newly-proposed printer control apparatus shown in FIG. 5 includes a central processing unit (CPU) 1 which converts blocks of input video data, supplied from an external unit, to corresponding blocks of operational video data, suitable for supply to a printer 8, in synchronization with respective bus cycles of the apparatus.

A memory unit 20 holds data temporarily during the data conversion processing, and read/write control circuitry 10 controls read/write operations between the printer 8, the central processing unit 1, and the memory unit 20.

The read/write control means 10 include an address latch unit 11, which temporarily holds the intended address of a block of operational data when that data is to be transferred from the central processing unit 1 to the memory unit 20, and a data latch unit 12 which temporarily holds the block of operational data to be transferred.

A block of operational data and its intended address, in the memory unit 20, are supplied in the second half of one bus cycle of the apparatus, and that video data is written at the supplied address, in the memory unit 20, in the first half of the next bus cycle.

Also, the said read/write control circuitry 10 includes a flyby transfer control unit 13, which receives control data, written as upper bits added to the address supplied by the central processing unit 1, and in dependence thereon automatically causes data to be passed directly between the printer 8 and the memory unit 20 without entering data into the central processing unit 1.

Furthermore, the memory unit 20 includes a video buffer 21, which stores the operational video data, converted to dot image data by the central processing unit 1, and outputs that data to the printer 8. The video buffer 21 comprises a memory able to store several pages of standard size (for example, A4 size), and the video data converted to the said dot image data is stored in these pages in units of words.

Figure 6:
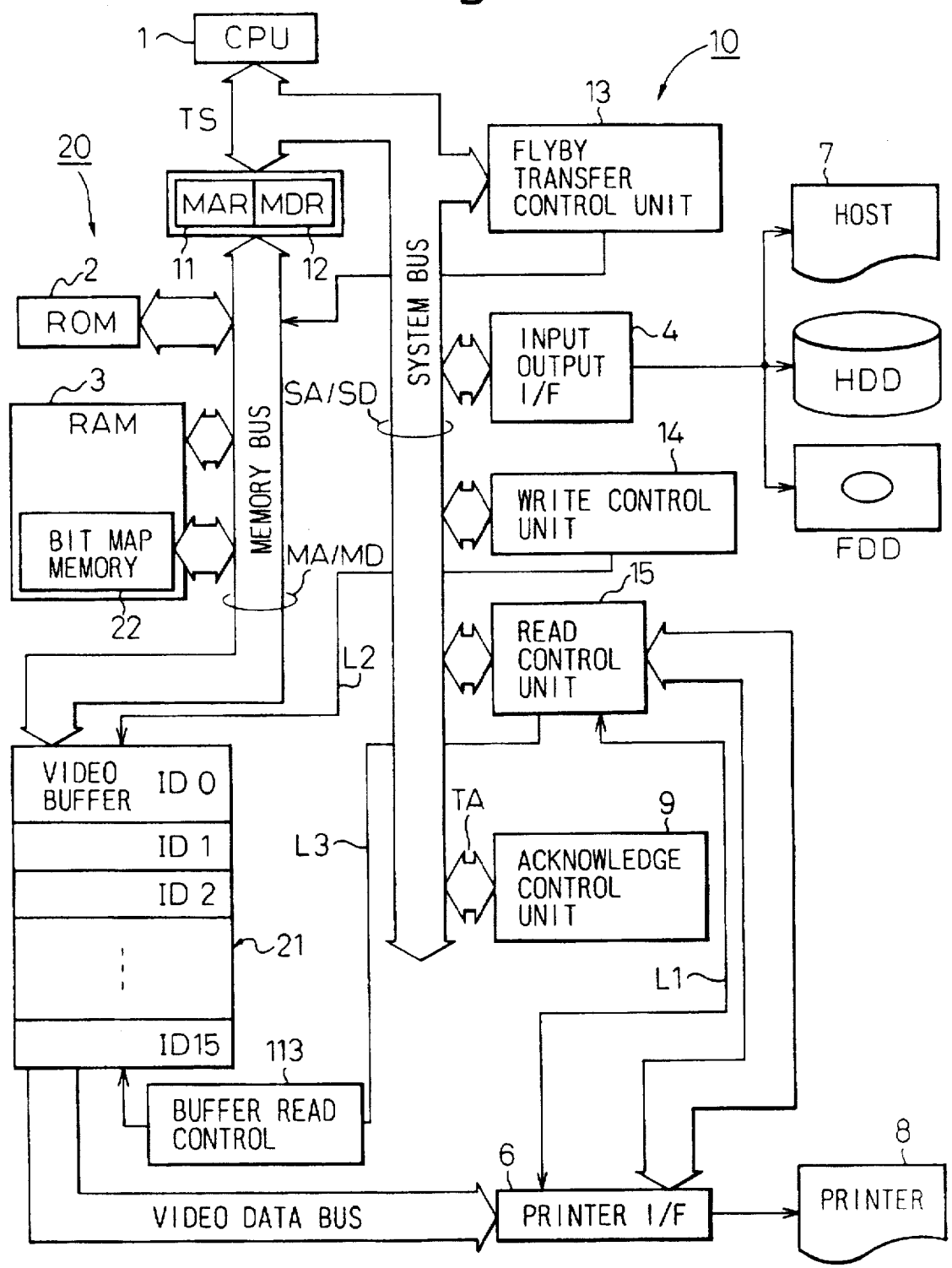
FIG. 6 is a more detailed schematic diagram of the printer control apparatus of FIG. 5.

FIG. 6 shows more details of the printer control apparatus of FIG. 5. Elements not shown in FIG. 5 include a write control unit 14 for controlling writing to the video buffer 21, a read control unit 15 for controlling reading from the video duffer 21, and a bit map memory 22. The bit map memory 22 converts image data produced by the CPU 1 to a bit map in the RAM 3. The video buffer 21 stores image data that has been converted to bit map format. Note that the memories 2, 3, 21, and 22 of the FIG. 6 are all included in the memory means 20 of FIG. 5.

The address latch unit 11 and data latch unit 12 are expressed as a memory address register (MAR) and a memory data register (MDR), respectively. These MAR and MDR are shown inserted in the system bus of FIG. 5 to effectively separate the system bus into a system bus proper and a memory bus. The CPU 1 is connected to the system bus proper (used to transfer system address data SA and system data SD), and the memory means (20) employ the memory bus for transferring memory address data MA and memory data MD.

The flyby control unit 13, write control unit 14, and the read control unit 15 are included in the read/write control means 10 of FIG. 5. Their functions will be explained in detail later.

Figure 7:
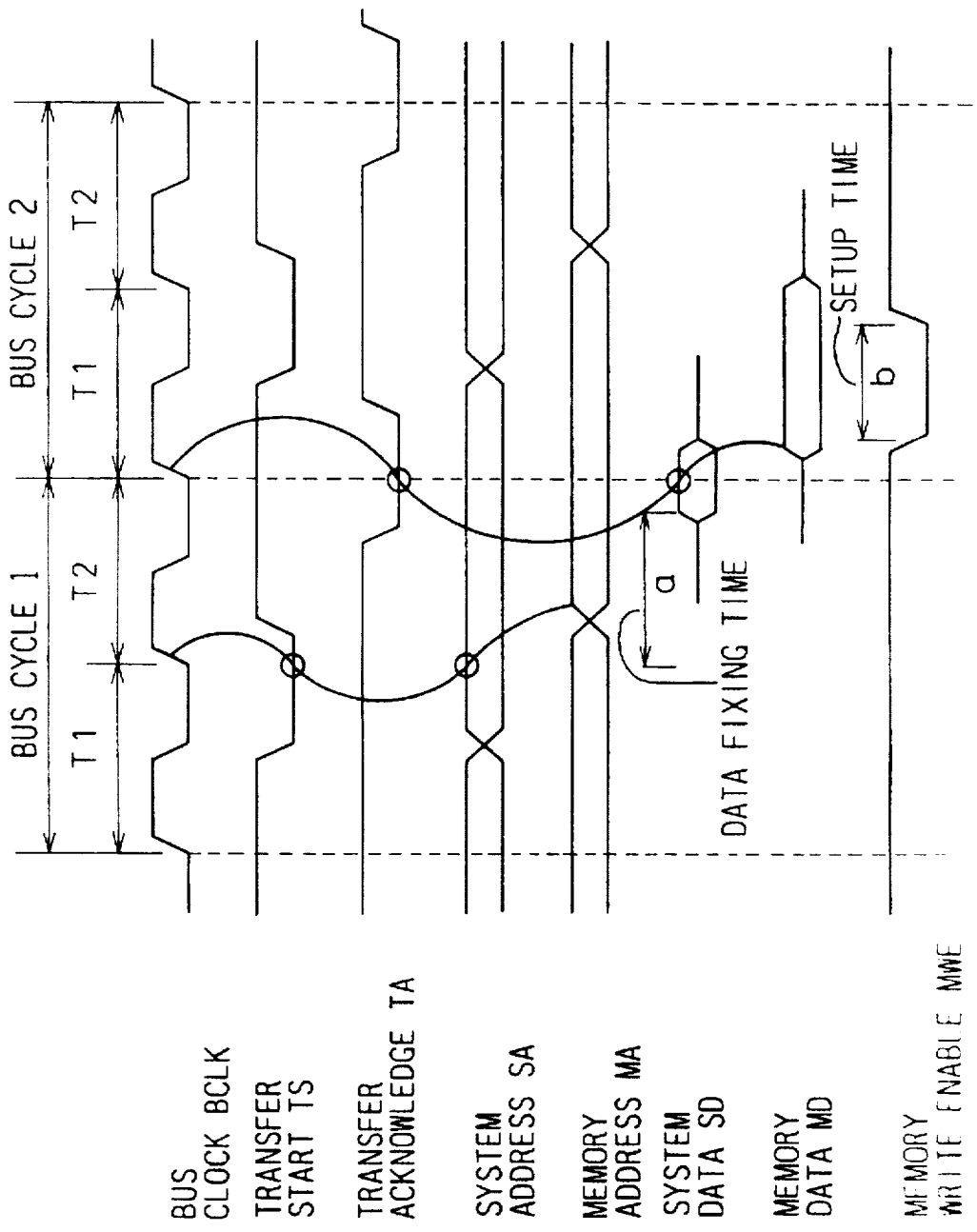
FIG. 7 is a timing diagram illustrating a data transfer operation in the apparatus of FIG. 5.

FIG. 7 is a timing diagram illustrating a data transfer operation in the apparatus of FIG. 6. The basic transfer operation shown in FIG. 7 is as follows.

i) Latching of an address into the address latch unit 11 is carried out at a time determined by a transfer start signal TS output from the central processing unit 1 during the first bus cycle shown.
 ii) Latching of a corresponding block of the video data into the data latch unit 12 is carried out in response to a transfer acknowledge signal TA, returned from the read/write control means (from the acknowledge control unit 9) to the central processing unit 1, at the time of termination of the first bus cycle.
 iii) Both the latching of the address in the address latch unit 11 and the latching of the video data in the data latch unit 12 are released when the transfer start signal TS is output during the second bus cycle.

The bus cycle of the CPU 1 is started by an "assert" (meaning an enable) of the transfer start signal TS and is terminated by an "assert" of the transfer acknowledge signal TA.

In the operation for writing data from the CPU 1 to the memory 3, an address, specified when the transfer start signal TS is asserted, is retained by the address latch unit 11. This address is retained until the TS of the next bus cycle. Data, specified when the transfer acknowledge signal TA is asserted, is retained by the data latch unit 12 until the signal TS of the next bus cycle is generated. By effectively utilizing the period from when the signal TA is generated to when the signal TS of the next bus cycle is generated to provide the setup time of the memory 3, data can be written satisfactorily without insertion of a wait cycle (FIG. 3). Such elimination of the need for a wait cycle enables the CPU 1 to start processing the next set of data without the delay previously caused by the use of a wait cycle.

Figure 8:
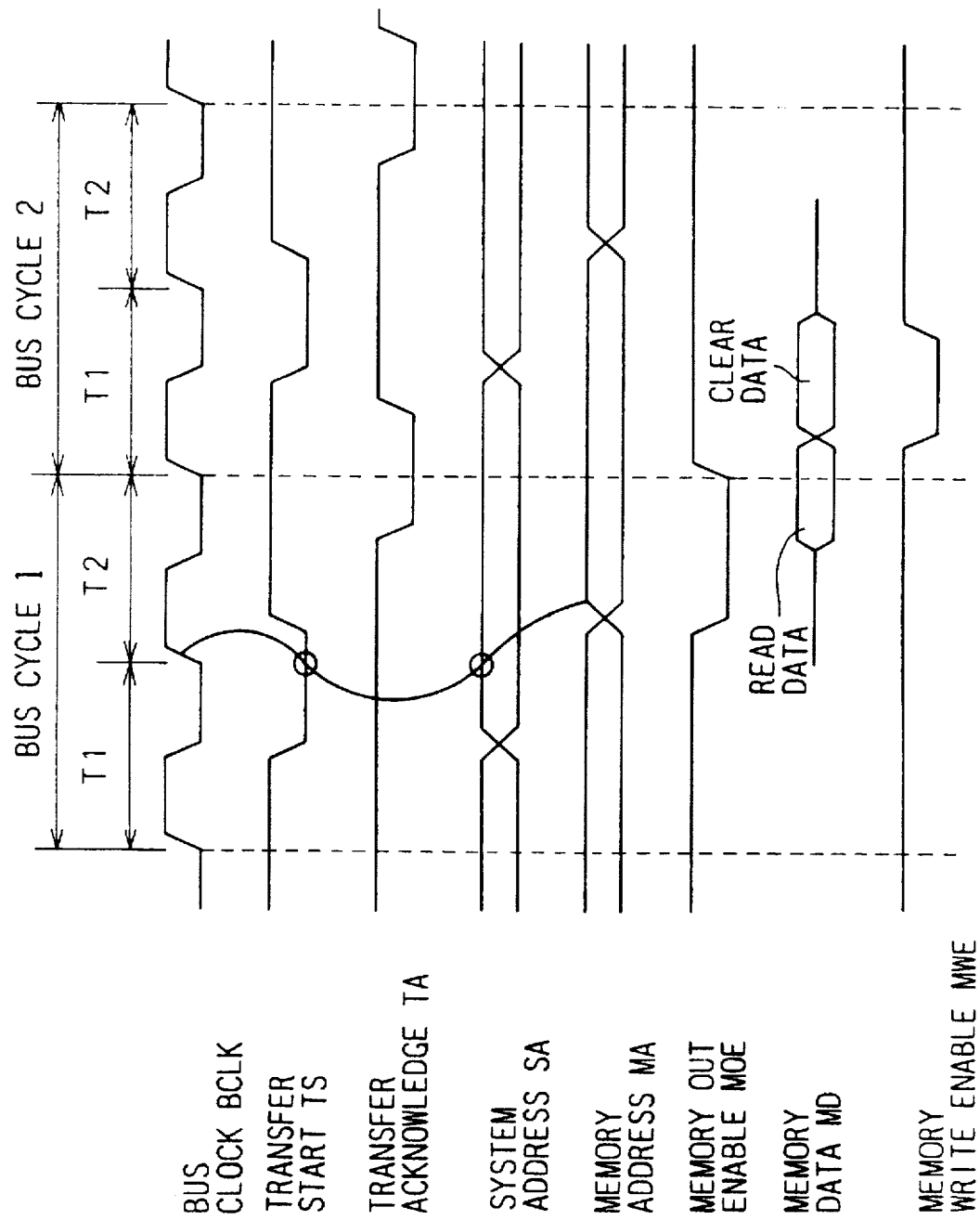
FIG. 8 is a timing diagram illustrating another mode of operation of the apparatus of FIG. 5.

The above-described data transfer technique can be applied also to the writing control of the clear data shown in FIG. 4. This will be described with reference to FIG. 8, which is a timing diagram of a writing operation of clear data in the apparatus of FIG. 6. The basic read/write operation shown in FIG. 8 is as follows.

The read/write control means 10 output clear data for erasing video data which has previously been written in the memory (bit map memory 22). It reads out the video data from a predetermined address in the memory means (memory 22), then writes the clear data at the same address. At this time, the write-after-read operation for writing clear data immediately after the read out of the video data, while the address is latched in the address latch unit 11, is completed in one bus cycle.

In an operation for reading out the video data from the RAM (bit map memory 22), and then writing clear data at the same address, in the same way as in FIG. 7, an address, specified when the transfer start signal Ts is asserted, is held by the address latch unit 11, this address is retained until the transfer start signal TS of the next bus cycle (Bus Cycle 2), and the clear data is sent to a memory side data bus during the period from the completion of the read out (after the signal TA is asserted) to the generation of the signal TS in the next cycle (Bus Cycle 2). Thus, in Bus Cycle 2, clear data is written at the same address read out in the preceding bus cycle (Bus Cycle 1).

The above-described operation can be summarized as follows.

i) Latching of the address in the address latch unit 11 is carried out at a timing determined by a transfer start signal TS, output from the central processing unit 1 during Bus Cycle 1.
 ii) The latching of clear data into the data latch unit 12 is carried out at a timing determined by a transfer acknowledge TA returned from the read/write control means (from the acknowledge control unit 9) to the central processing unit 1 at the time of termination of Bus Cycle 1.
 iii) Both the latching of the address in the address latch unit 11 and the latching of the video data in the data latch unit 12 are released at a timing determined by the transfer start signal TS output during Bus Cycle 2.

On the other hand, looking at "READ DATA" in the row of the memory data MD of FIG. 8, the read out of the video data is carried out when a memory out enable signal MOE is applied to the memory means (bit map memory 22). Subsequent writing of the clear data in the memory means (bit map memory 22) is carried out when a memory write enable signal MWE is applied to the memory means (bit map memory 22) and a clear data send signal (WR) is applied to the data latch unit 12. The memory write enable signal MWE and the clear data send signal (WR) are both generated at the same time in the first half of Bus Cycle 1. This facilitates high-speed printing. Note that, the clear data send signal WR will be shown in FIG. 11 later.

In the FIG. 6 apparatus, as already mentioned, the read/write control means 10 includes a flyby transfer control unit 13 which receives control data written in several upper bits of the address from the central processing unit 1 and autonomously performs read/write operations of the video data between the printer 8, the central processing unit 1, and the memory means 20, in accordance with the contents of the control data, without going through the central processing unit 1.

Furthermore, the memory means 20 includes a video buffer 21 which stores video data converted to dot image data by the central processing unit 1 and outputs the same to the printer 8. The video buffer 21 comprises a memory able to store several standard size pages (for example, A4 size). Video data converted to data of a dot image is stored in the said pages in units of words.

FIG. 9 is a table of the contents of part of the control data used in the FIG. 5 apparatus; and FIG. 10 is a table of the contents of another part of the said control data used in that apparatus.

In FIG. 9 and FIG. 10, A31, A28, A27, A30, and A29 indicate an upper 31-th bit, 28-th bit, 27-th bit, 30-th bit, and 29-th bit respectively of a block of address data (for example 32 bit block) from the CPU 1. R/W is a read/write signal which is a control signal given from the CPU 1 separately from the above-described address block. The control bits A31, A28, A27, R/W, A30, and A29 are supplied to the flyby transfer control unit 13. 1 denotes a data "1", 0 denotes a data "0", and x denotes "don't care" (non-effective data bit).

Referring to FIG. 9, the contents of the control data written in several upper bits (A31, A28, A27) of the address given from the CPU 1 are:

i) a normal read indication indicating a normal read operation from the read/write control means 10 to the central processing unit 1;

ii) a normal write indication indicating a normal write operation from the central processing unit 1 to the read/write control means 10;

iii) a flyby read indication indicating a read operation from the video map memory 22, which stores the video data in the form of dot image data, directly to the video buffer 21 which stores the video data to be output to the printer 8;

iv) a flyby write indication indicating the write operation from the video buffer 21 directly to the bit map memory 22; and v) a flyby read modify write indication indicating an operation of writing clear data for erasing video data, which has been already written in the bit map memory 22, immediately after read-out of the video data from the bit map memory 22 to the video buffer 21 is carried out.

Referring to FIG. 10, the contents of the control data written in two upper bits (A30, A29) of the address given from the CPU 1 includes control indications added in the form of control flags for each of the words constituting the video data to the video buffer 21. The control flags include:

i) a flag indicating that the transfer of the video data should be continued;

ii) a flag indicating that the video data corresponds to the end of one line on the printer 8 and that the system should wait for arrival of a horizontal synchronization signal (HS) from the printer 8;

iii) a flag indicating that the video data corresponds to the end of one line on the printer 8 and corresponds to the final line of a page worth of data from the video buffer 21, and accordingly the page should be changed; and iv) a flag indicating that the video data corresponds to the end of one line on the printer 8 and corresponds to the end of the aforesaid page and accordingly the transfer of video data should be terminated.

The writing of the video data from the bit map memory 22 to the video buffer 21 is carried out by a write control unit 14, and the read out of the video data to the printer 8 is carried out by a read control unit 15. In this case, the read control unit 15 performs the transfer control between the video buffer 21 and the printer 8, according to the indications by the control flags shown in FIG. 10 for every word.

Figure 11:
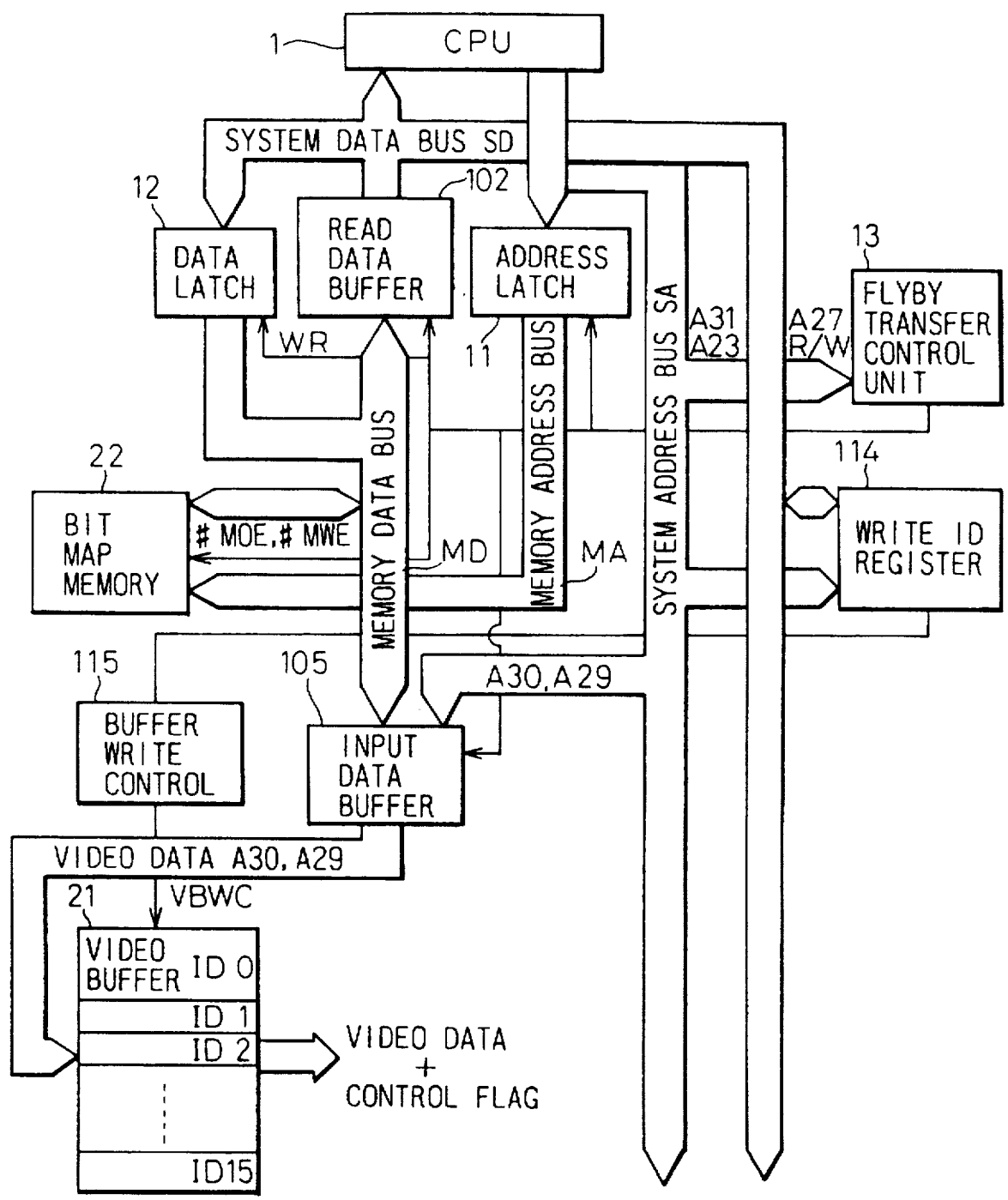
FIG. 11 is a more detailed schematic diagram of part of the data transfer apparatus of FIG. 6.
Figure 12:
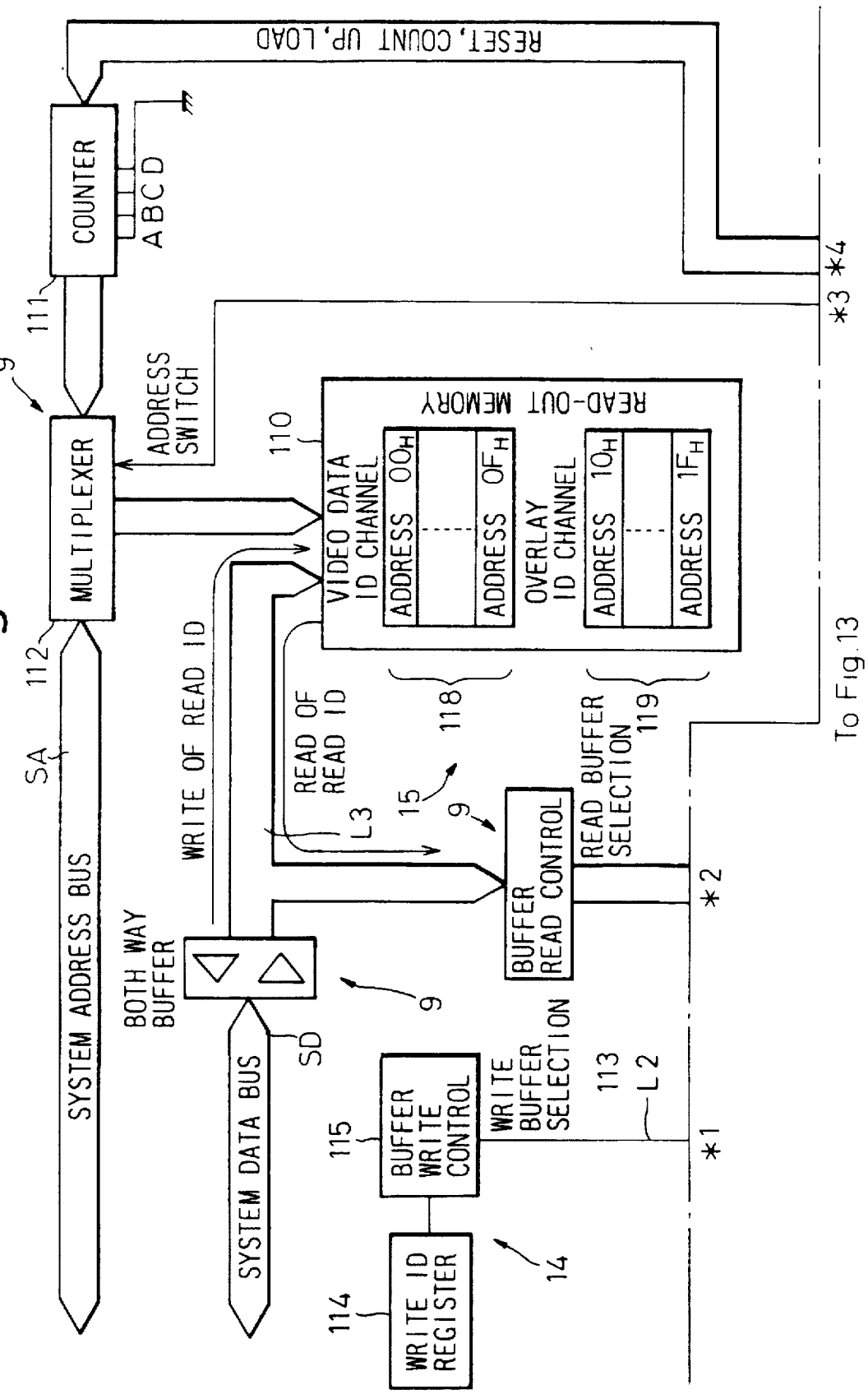
FIGS. 12 and 13 are partial schematic diagrams of a read out control part of the data transfer apparatus of FIG. 6.
Figure 13:
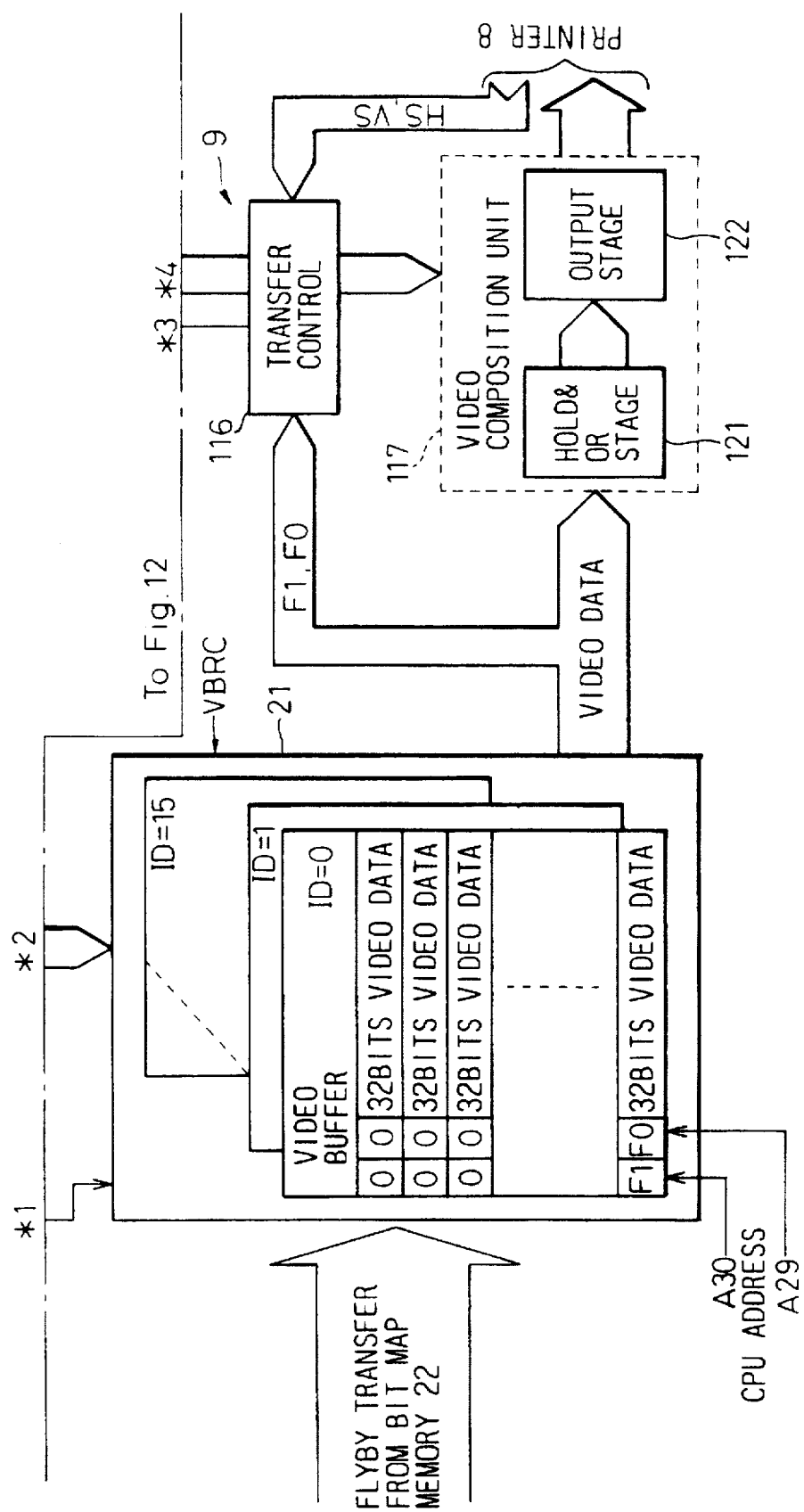

FIG. 11 is a schematic diagram of a part of the data transfer system of FIG. 6, and FIGS. 12 and 13 show views of a read out control part of the FIG. 6 system. As clearly shown in FIG. 13 (and FIG. 5), the video buffer 21 comprises a memory able to store several standard size pages (for example, A4 size). The video data converted to the data of a dot image is stored in the pages in units of words.

The video buffer 21 may be constituted by a DRAM type FIFO memory, enabling once written data to be read out many times.

The central processing unit 1 selects the page, from the pages constituting the video buffer 21, on which the video data should be written by an ID allocated to each of the pages. Corresponding to this, the memory means 20 has a write ID register 114 (shown also in FIG. 12) which stores the selected ID.

The read/write control means 10 has a buffer write control unit 115 (shown also in FIG. 12) which selects one or more pages corresponding to the ID in question among the several pages (ID=0, ID=1, . . . ID=15) based on the ID in the write ID register 114.

The central processing unit 1 designates which page from the several pages constituting the video buffer 21 the video data should be read out from, by the ID allotted to each of the pages. This designated ID is stored in the read-out memory 110 (FIG. 12) in the memory means 20.

This read-out memory 110 is divided into a video data channel area 118, which holds the ID corresponding to the page, from the pages in the video buffer 21 on which the video data is stored, and a form overlay channel area 119, which holds the ID corresponding to the page, from the pages in the video buffer 21, on which the form overlay is stored.

The read/write control means 10 have a buffer read control unit 113 (FIG. 12) for selecting the page corresponding to the ID in question based on the ID in the read-out memory 110.

The read/write control means 10 further have a video composition unit 117 (FIG. 13) which combines the data of the page corresponding to the ID read out from the video data channel area 118 and the data of the page corresponding to the ID read out from the form overlay channel area 119 and outputs the result to the printer 8. The form overlay may be preprinting information that is to be printed on the printing sheet (for example, the frame of a table etc.), that is, the preformat information. Image data such as a photographic image may also be included.

The video composition unit 117 is provided with a first stage register 121 (FIG. 13) and a second stage register 122 (FIG. 13). In the first stage register 121, the data of the page corresponding to the ID read out from the video data channel area 118 is held for every word, and then the data of the page corresponding to the ID read out from the form overlay channel area 119 and the data of the video data channel (118) which was held are combined. In the second stage register 122, composite data from the first stage register 121 is copied and output to the printer 8. At the same time, the first stage resister 121 starts the composition processing of the next word of data appearing.

As mentioned above, by allotting upper bits of the address of the CPU 1 for control bits used for the read/write control of the memory and the send control of the clear data, transfer of data without using the CPU 1 becomes possible. Since a bus master other than the CPU 1 thus becomes unnecessary, simplification of the circuit becomes possible. Note that, for the data transfer mode, expansion to add various functions becomes possible by increasing the number of control bits.

Also, when the video data (image data), which has been converted into bit map form in the memory (22) is transferred to the video buffer 21, control flags (A30, 29) are added for every word and stored in the video buffer 21. Control flags for end of line, end of line/end of page, etc., in the image data, which control flags are read out simultaneously when that image data is read out in units of words can be detected by hardware. It thus becomes possible for the CPU 1 to perform other processing even during the transfer of a page (data of the video buffer).

The ID is used for selecting the video buffer page, of the video buffer 21 having a capacity of several pages (ID=0, ID=1, . . . , ID=15) of a certain size, from which the data is to be read out. By providing one area for the usual page data (channel area 118) and another area for the form overlay (channel area 119) in the memory 110 storing this ID, it becomes possible for the user to optionally set up either area for the usual page data or for the form overlay. Where the form overlay is not used, it becomes possible to use all of the video buffer 21 for the usual page data. By changing the memory 110 to the appropriate area, for the usual page data or for the form overlay respectively, by a clock when reading out page data and form overlay data from the video buffer 21, the page data and the form overlay data can be alternately read out for every word, and this data is combined and sent to the printer 8, whereby it becomes possible to simultaneously print the page data and form overlay at the printer 8.

The structure shown in FIG. 11 is a detail of a part relating to the data transfer from the CPU 1 to the RAM 3 (or bit map memory) and a part relating to the data transfer from the bit map memory 22 to the video buffer 21 in the structure of FIG. 6.

In the data latch unit 12, data is held and clear data is sent out. In the address latch unit 11, the address from the CPU 1 is latched. In the read data buffer 102, read out data from the RAM 3 or the ROM 2 is buffered. The write ID register 114 holds the ID for selecting the page of the video buffer 21 in which the video data should be written.

The operation of the structure shown in FIG. 11 will be explained with reference to the timing chart of FIG. 7.

The CPU 1 operates using two clock cycles of T1 and T2 as one bus cycle. The start of the bus cycle is indicated by the transfer start signal TS as already mentioned and the bus cycle is terminated by the input of the transfer acknowledge signal TA. The CPU 1 asserts the transfer start signal (TS) in the latter half of the T1 cycle and sends the address and signal R/W. This address is latched by the address latch unit 11 at a rising edge of the bus cycle (BCLK) when the signal TS is asserted (rising of BCLK at the end of the T1 cycle), and is held up until the rising of the BCLK in the latter half of the T1 cycle of the next bus cycle 2. The data from the CPU 1 is sent by the termination of the T2 cycle of the bus cycle 1 even if it is sent with a long delay (fixing time a), and that data is latched in the data latch unit 12 at the rising of the BCLK at the end of this T2 cycle and held until the rising of the BCLK at the end of the T2 cycle of the next bus cycle 2.

The write pulse of the RAM 3 or the bit map memory 22, is asserted during the first half of the T1 cycle of the bus cycle 2, whereby it becomes possible to perform the writing in the first half of the T1 cycle of the bus cycle 2. The address latch unit 11 and the data latch unit 12 can be realized by a simple circuit structure using a PLD (programmable logic device) or the like. An explanation will be made next of the data transfer from the bit map memory 22 to the video buffer 21.

The allocation of upper address bits of the CPU 1 are as shown in FIGS. 9 and 10. The CPU 1 has a block size of 32 bits for both address and data.

A31 indicates a flyby transfer enable; A30 and A29 indicate control flags added for every word (32 bits) of the image data at the flyby transfer; (0, 0) indicates a transfer continuity; (0, 1) indicates a line end; (1, 0) indicates the end of line/end of video buffer; and (1, 1) indicates the end of line/end of video buffer/end of page. A28 indicates either a direction of data from the bit map memory 22 to the video butter 21 (flyby read) or a direction from the video buffer 21 to the bit map memory 22 (flyby write).

A27 indicates the writing (flyby read modify write) of clear data after the flyby read.

Figure 14:
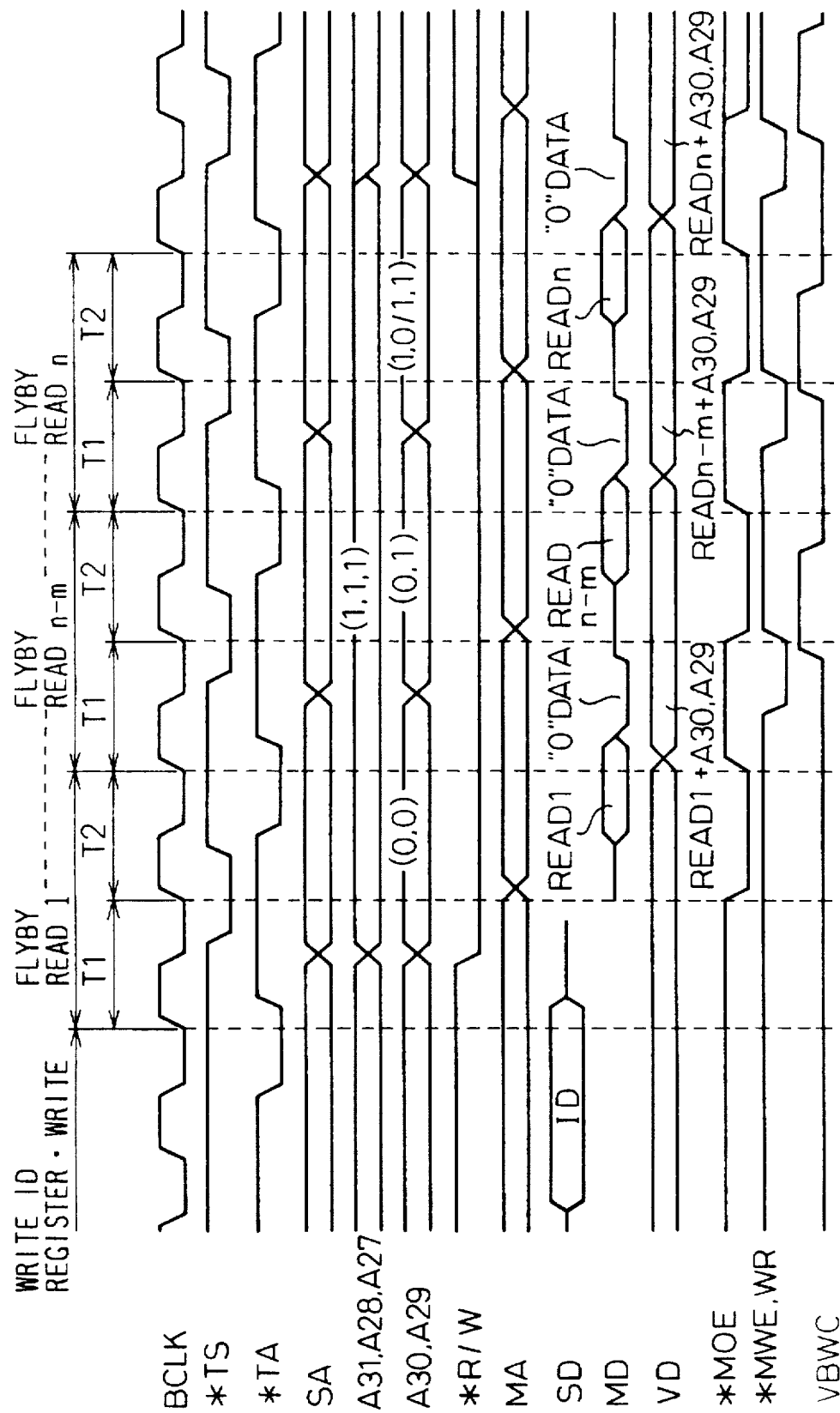
FIG. 14 is a timing diagram illustrating a flyby transfer operation in the apparatus of FIG. 6.

FIG. 14 is a timing chart of a detailed example of the flyby transfer used in embodiments of the present invention. The CPU 1 sets the ID of the video buffer 21 which should transfer video data into the write ID register 114, during the first bus cycle. In the next bus cycle, the CPU 1 sets (A31, A30, A29, A28, A27) to (1, 0, 0, 1, 1) and sets the read/write control signal R/W to the read setting, latches the address at the rising of the BCLK in the latter half of the T1 cycle in the same way as in FIG. 7, and holds the address until the rising of the BCLK in the latter half of the T1 cycle of the next cycle. The flyby transfer control unit 13 transfers the memory out enable signal *MOE to the bit map memory 22 in the period of the T2 cycle by the A31, A28, A27, TS, and BCLK and reads out the video data from this bit map memory 22. The memory out enable signal *MOE is negated (meaning disabled) at the end of the T2 cycle, and the flyby transfer control unit 13 sends the memory write signal *MWE to the bit map memory 22 during the period of the first half of the T1 cycle of the next bus cycle and sends the clear data send signal WR to the data latch unit 12. By sending the clear data from this data latch unit 12, it becomes possible to write this clear data in the bit map memory 22 in the first half of the T1 cycle of the next bus cycle.

In the example of the figure, the aforesaid clear data is brought to "0" and is used for clearing of the bit map memory 22.

In parallel with the above-described operation, the read out video data is latched by the input data buffer 105 at the rising of the BCLK in the latter half of the T2 cycle and held until the rising of the BCLK in the latter half of T2 cycle of the next cycle. In the buffer write control unit 115, the video buffer write clock signal VBWC is sent to the selected video buffer 21 by A31, A28, A27, BCLK, and TS and the ID set in the aforesaid write ID register 114, and A30 and A29 are written into the video buffer 21, together with the video data (VD) held in the input data buffer 105. At this time (A30, A29) is (0, 0), and therefore one word of video data written in the video buffer 21 is stored in the video buffer 21 as data having the meaning of transfer continuity.

Similarly, in the subsequent (n-m)th bus cycle (A30, A29) is set to (0, 1). At this time one word of data is stored in the video buffer 21 as the data of the end of line (last line).

Similarly, in the subsequent nth bus cycle (A30, A29) is set to (1, 0). At this time one word of data is stored in the video buffer 21 as the data of the end of line/end of video buffer (last line/last buffer), and the flyby read modify write cycle is terminated.

When (A30, A29) is set to (1, 1), the one word of data is stored in the video buffer 21 as the data of the end of line/end of video buffer/end of page (last line/last buffer/last page), and the flyby read modify write cycle is terminated.

Similarly, in a case where (A31, A28, A27) is (1, 1, 0), *MWE and WR are not sent, and the usual flyby read is carried out, where (A31, A28, A27) is (1, 0, 0), the data transfer (flyby write) from the video memory 21 to the bit map memory 22 is carried out. In this flyby write, A30 and A29 stored in the video buffer 21 are ignored, and only the image data is written in the bit map memory 22. This transfer data is used to check the video buffer 21, etc.

FIGS. 12 and 13 will now be referred to again. The read out memory 110 stores the ID of the video buffer to be read out; a counter 111 counts the address of the memory 110; a multiplexer 112 performs the change over between the counter output sent by the counter 111 and the address sent by the CPU 1; and the buffer read control unit 113 decodes the read ID stored in the memory 110 and selects the page of the video buffer 21 to be read. The transfer control unit 116 performs the read out of the video buffer 21 and the transfer control of the video data to the printer 8.

The video composition unit 117 combines the video data read out from the video buffer 21 for every word and transfers the result.

A detailed explanation will now be made of a case where the video data is transferred from the video buffer 21 to the printer 8. The read-out memory 110 comprises addresses storing the ID for selecting the video buffer 21 in which the video data is stored, that is, addresses 00H to 0FH (video data channel area 118), and addresses storing the ID selecting the page in the video buffer 21 in which the form overlay is stored that is, addresses 10H to 1FH (form overlay channel area 119). Note that H denotes hexadecimal notation.

The CPU 1 first writes the ID of the page in the video buffer 21 to be read at an address 00H, and, if the form overlay is registered, writes the ID of the video buffer 21 in which the form overlay is registered at an address 10H.

The structure of the video buffer 21 uses one A4 size page worth of data as a unit, and therefore if the video data is smaller than A4 size, only one ID is set.

Conversely, when the video data is larger than A4 size, it is necessary for the subsequent addresses, that is addresses 01H, 02H . . . , 0FH to be set. Similarly, for the form overlay, it is necessary for the subsequent addresses, that is addresses 11H, 12H, . . . 1FH to be set. In the present example, it is effective for not only the page size, but also for an increase of density of the image to be printed on the printing sheet. For example, when two A4 size pages (corresponding to one A3 size sheet) worth of video data is printed on one A4 size sheet, printing having twice the dot density can be carried out.

When a vertical synchronizing signal VS or a horizontal synchronizing signal HS (FIG. 13) enter the transfer control unit 116 from the printer 8, the multiplexer 112 is changed to the counter 111 side and accesses the address 00H of the read-out memory 110, so that one byte of read ID is read out. Here, the read out ID is decoded by the buffer read control unit 113, the read clock VBRC is sent to the page of the video buffer 21 to be read out, and control flags F1, F0 (FIG. 13) are read out together with the one word of video data. The read out F1 and F0B are decoded by the transfer control unit 116 to perform the operation defined in FIG. 10, respectively. Where (F1, F0) is (0, 0), the data transfer is continued. Where (F1, F0) is (0, 1), it is the end of line, and the transfer control unit 116 resets the counter, etc. monitoring each line. Where (F1, F0) is (1, 0), it is the end of line/end of video buffer, and the transfer control unit 116 counts up the counter 111 (FIG. 12) and increments the address of the read-out memory 110 (00H to 01H). Where (F1, F0) is (1, 1), it is the end of line/end of buffer/end of page and the transfer control unit 116 resets the counter 111 and terminates the data transfer from the video buffer 21.

Figure 15:
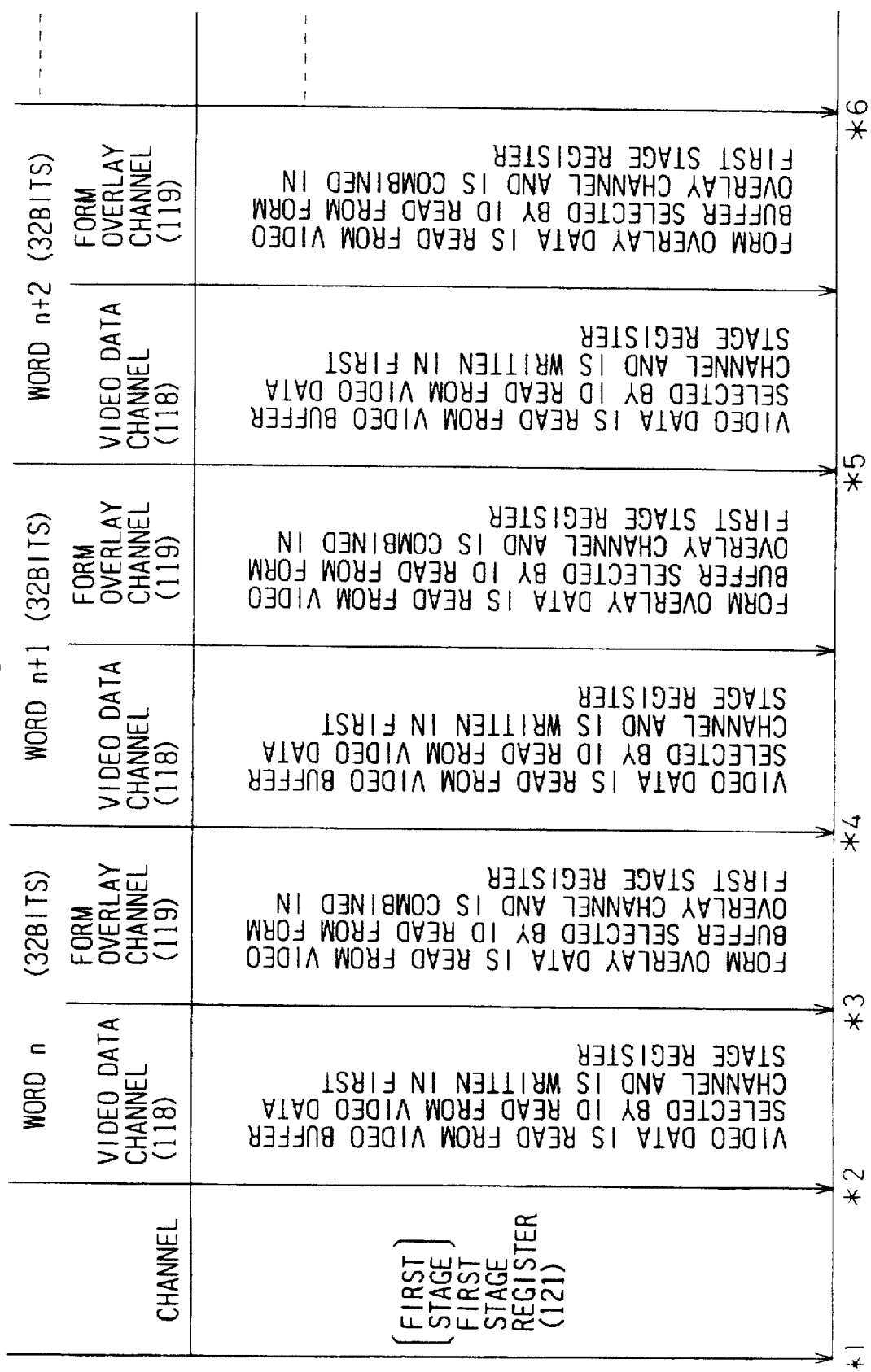
FIGS. 15 and 16 are diagrams illustrating the operation of a video composition unit shown in FIG. 13.
Figure 16:
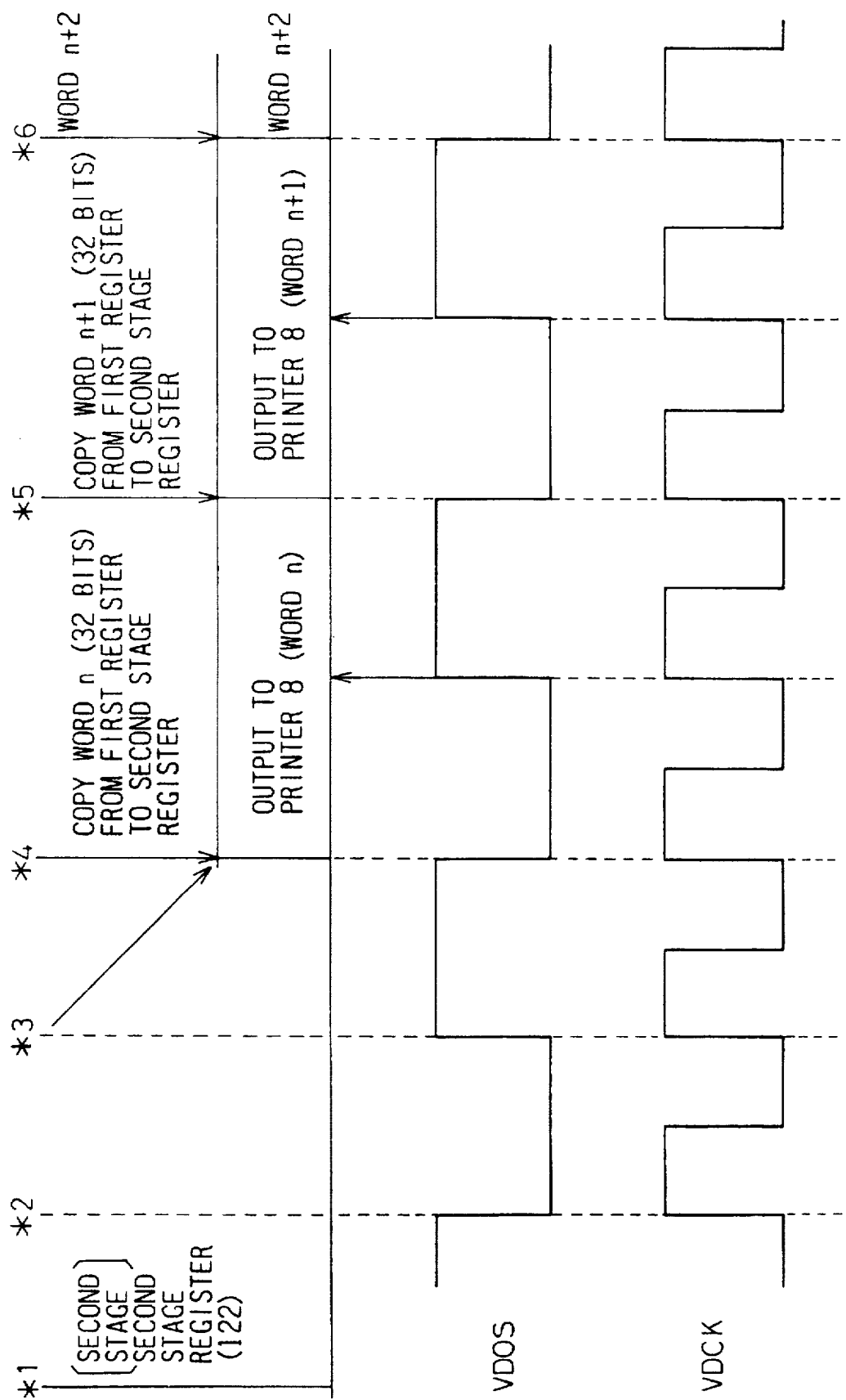

FIGS. 15 and 16 are diagrams for explaining the operation of the video composition unit. The video composition unit 117 (FIG. 13) consists of two stages, a first stage register 121 and a second stage register 122, and the read out of the video data is carried out using respective ID information from two channels (the video data channel (118) and the form overlay channel (119)). The video data read out from the page in the video buffer 21 selected by the ID stored in the video data channel is held in the video composition unit 117 by the basic clock VDCK (FIG. 16). When the form overlay exists, the address of the read-out memory 110 is set up in the form overlay channel area 119, and the video data is read out using the ID in the selected video buffer and is held in the video composition unit 117 by the subsequent VDCK. It is combined with the above-mentioned video data which has been held. The data in the first stage register (hold register) 121 is transferred to the second stage register (output register) 122 at the falling of the subsequent video strobe signal VDOS (FIG. 16), and one word of video data is transferred to the printer 8 at the rising of the subsequent video strobe signal VDOS. At this time, in the hold register 121, the data of one word (n+1) is held from respective channels in the same way as in the above description, and they are combined. The above-described series of transfers is continued until the control flag (F1, F0) becomes (1, 1).

Figure 17:
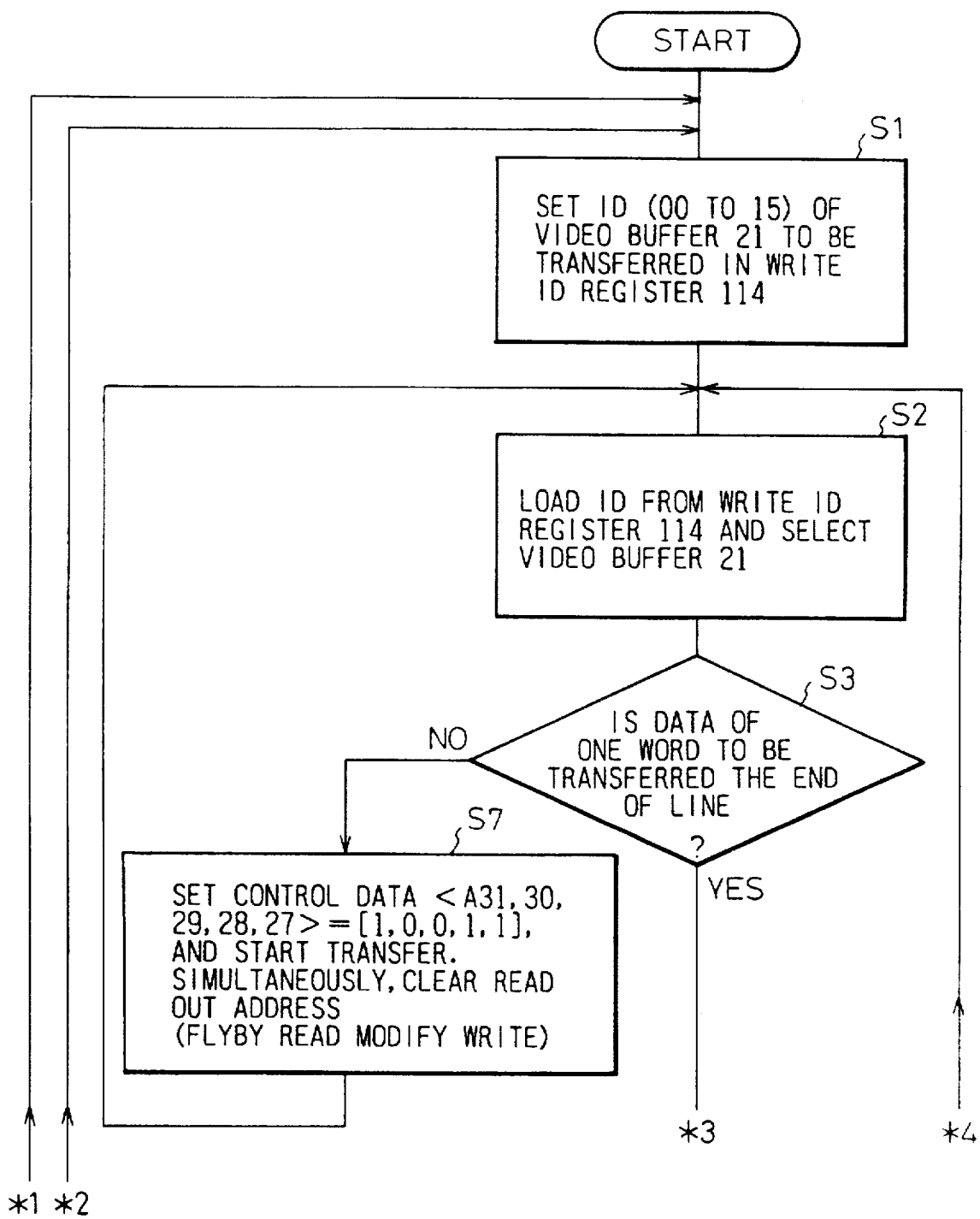
FIG. 17 and FIG. 18 are partial flow charts of a data transfer operation from a bit map memory to a video buffer of FIG. 6.
Figure 18:
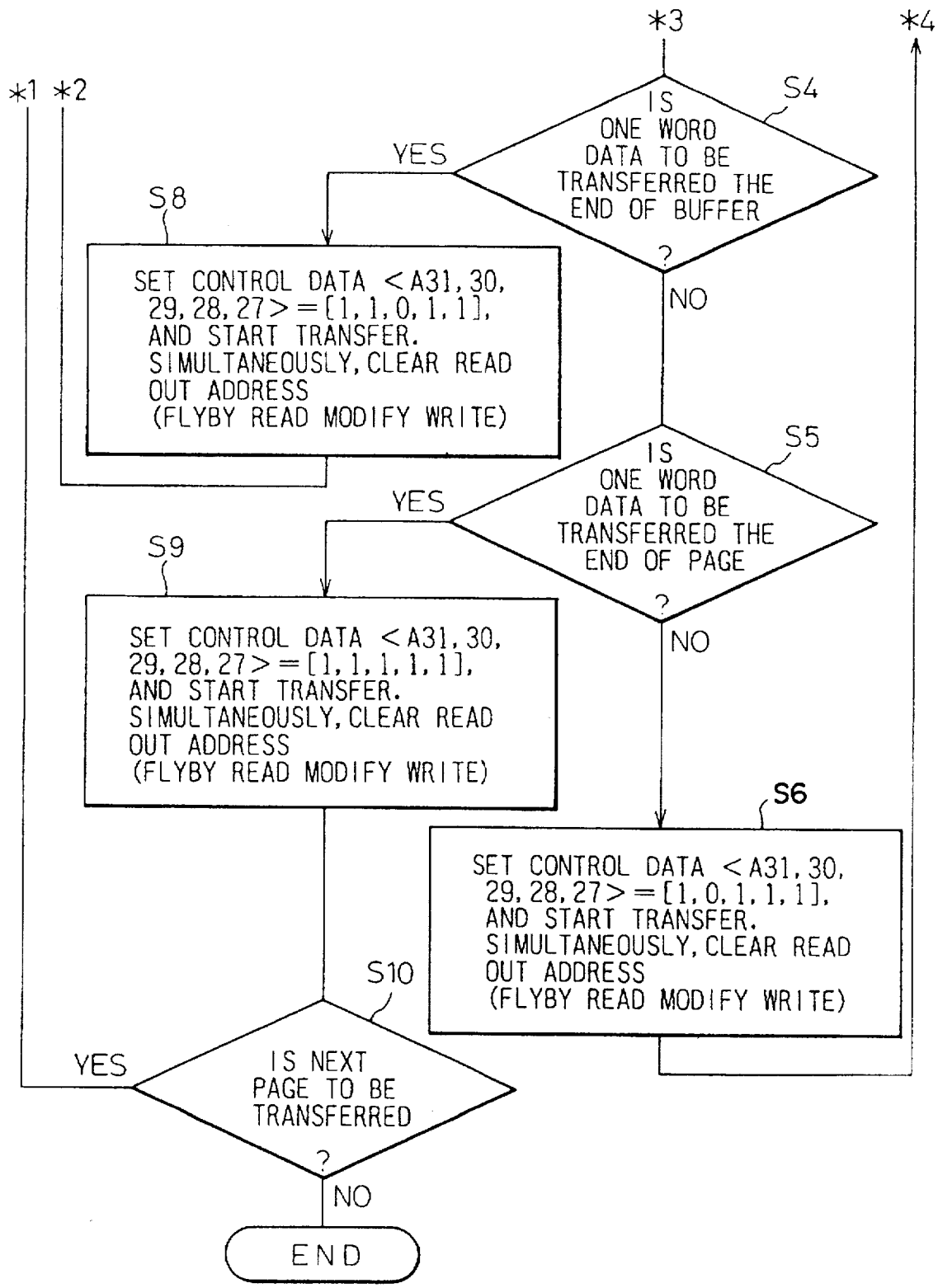
Figure 19:
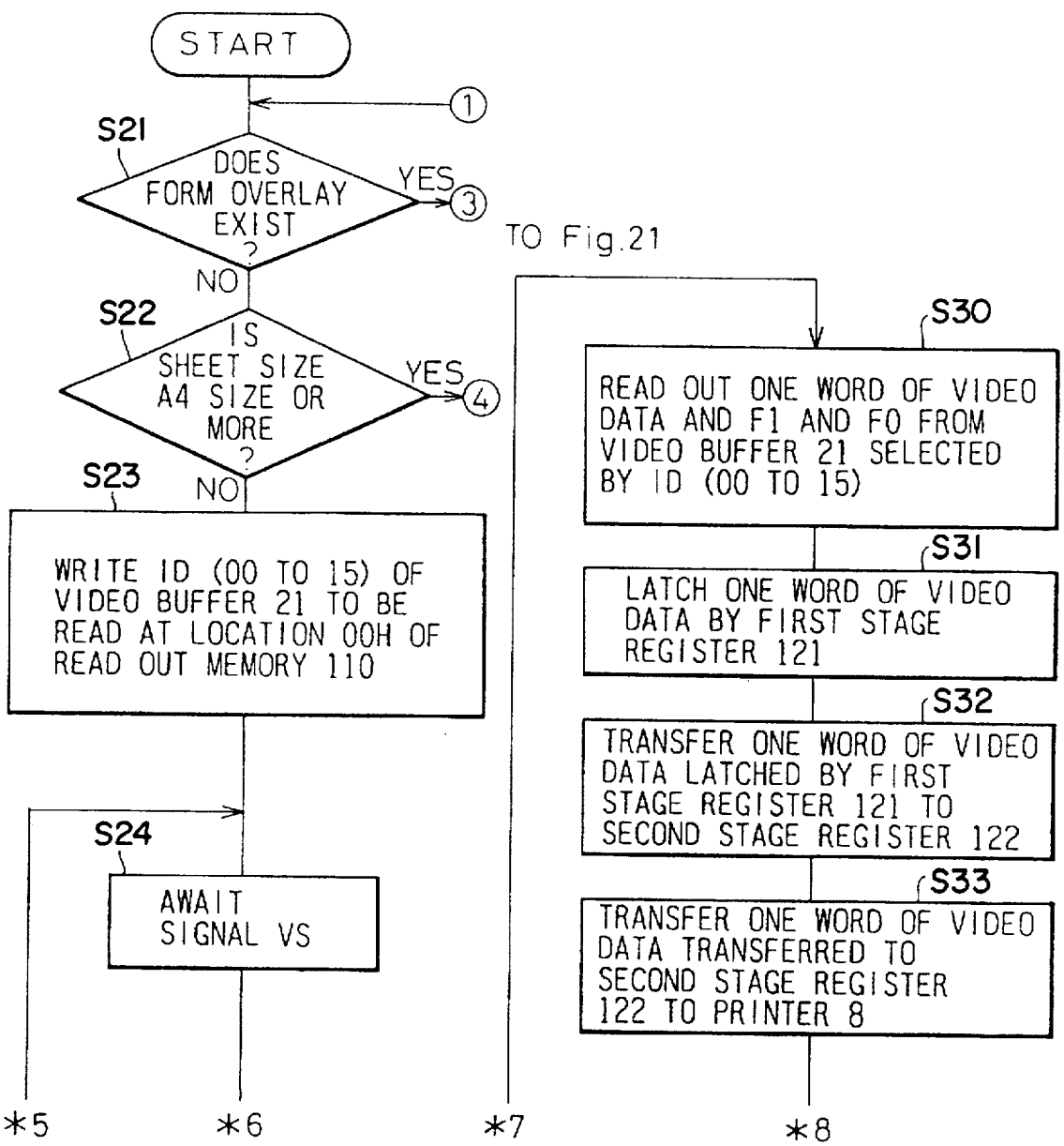
FIG. 19 and FIG. 20 are partial flow charts of a data transfer operation from the video buffer to a printer of FIG. 6.
Figure 20:
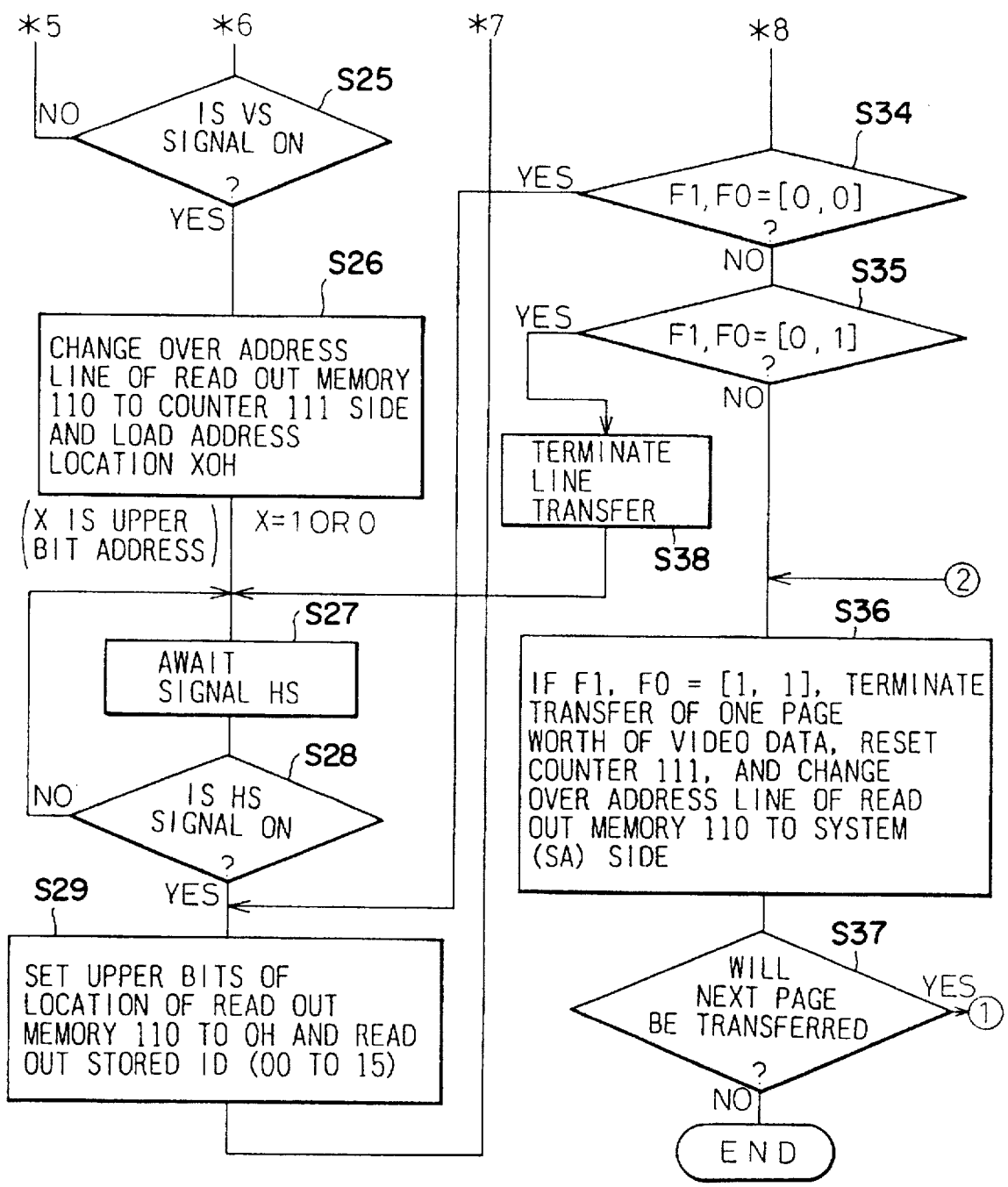
Figure 21:
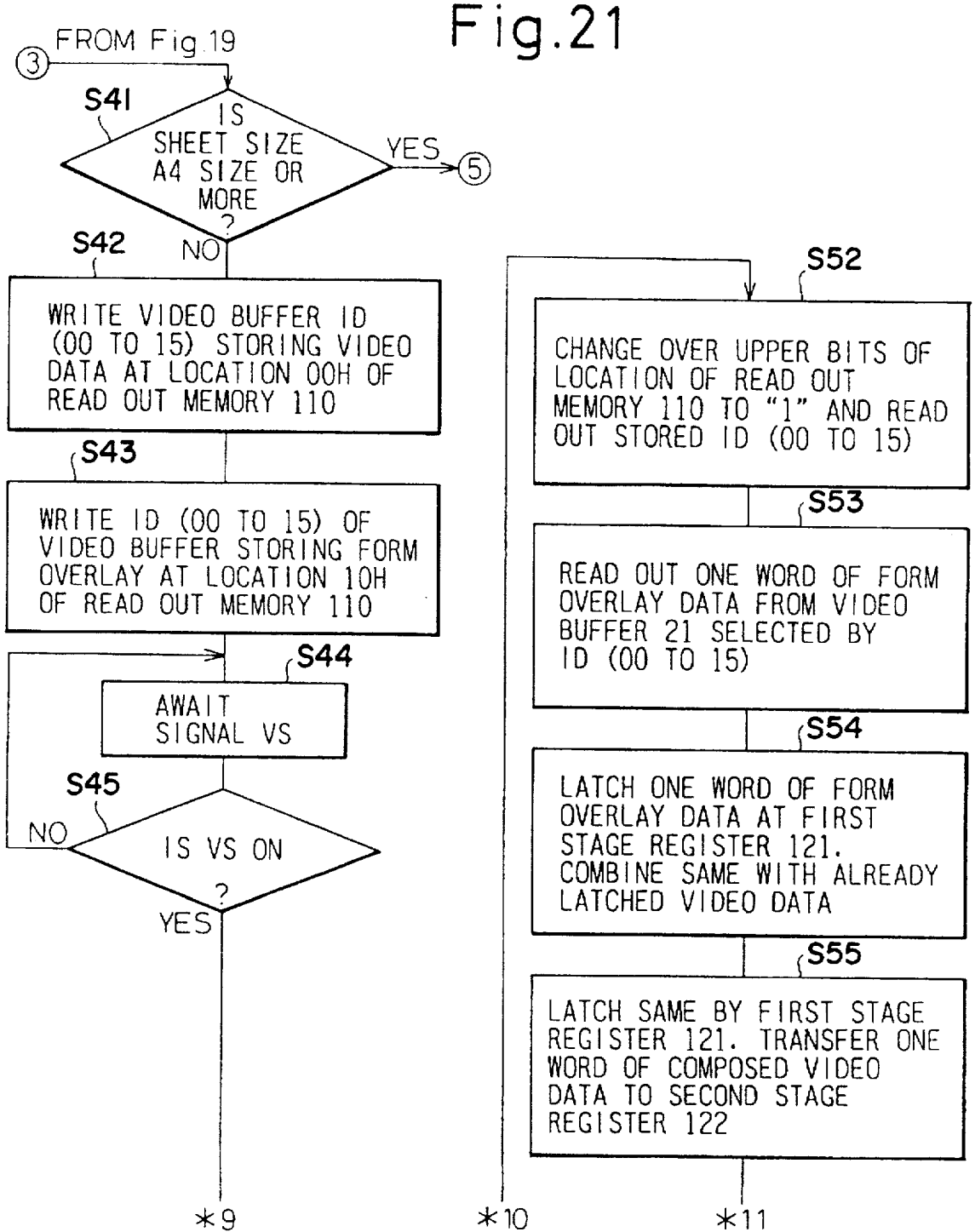
FIG. 21 and FIG. 22 are partial flow charts of a data transfer operation in a route branched from a step S21 of FIG. 19.
Figure 22:
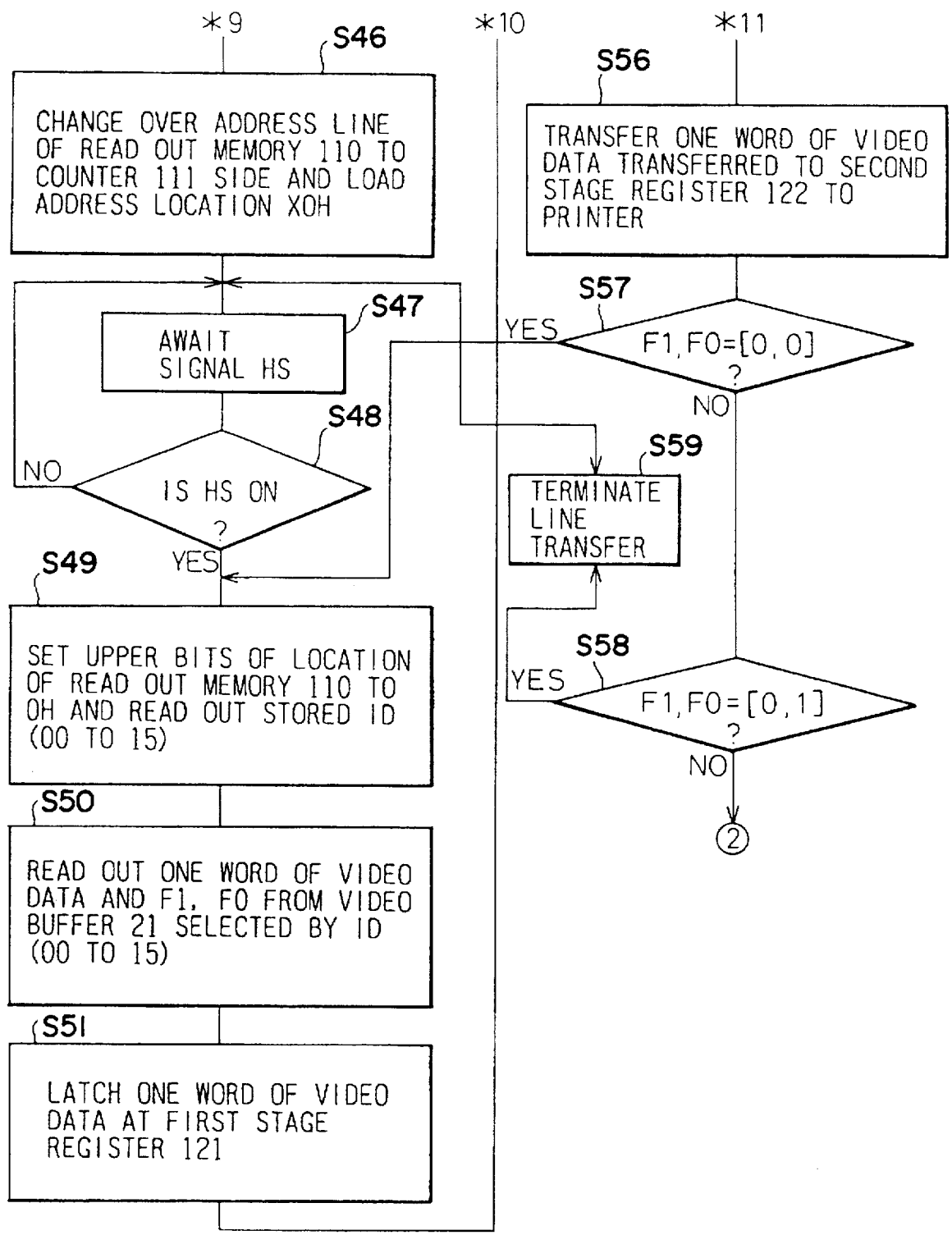
Figure 23:
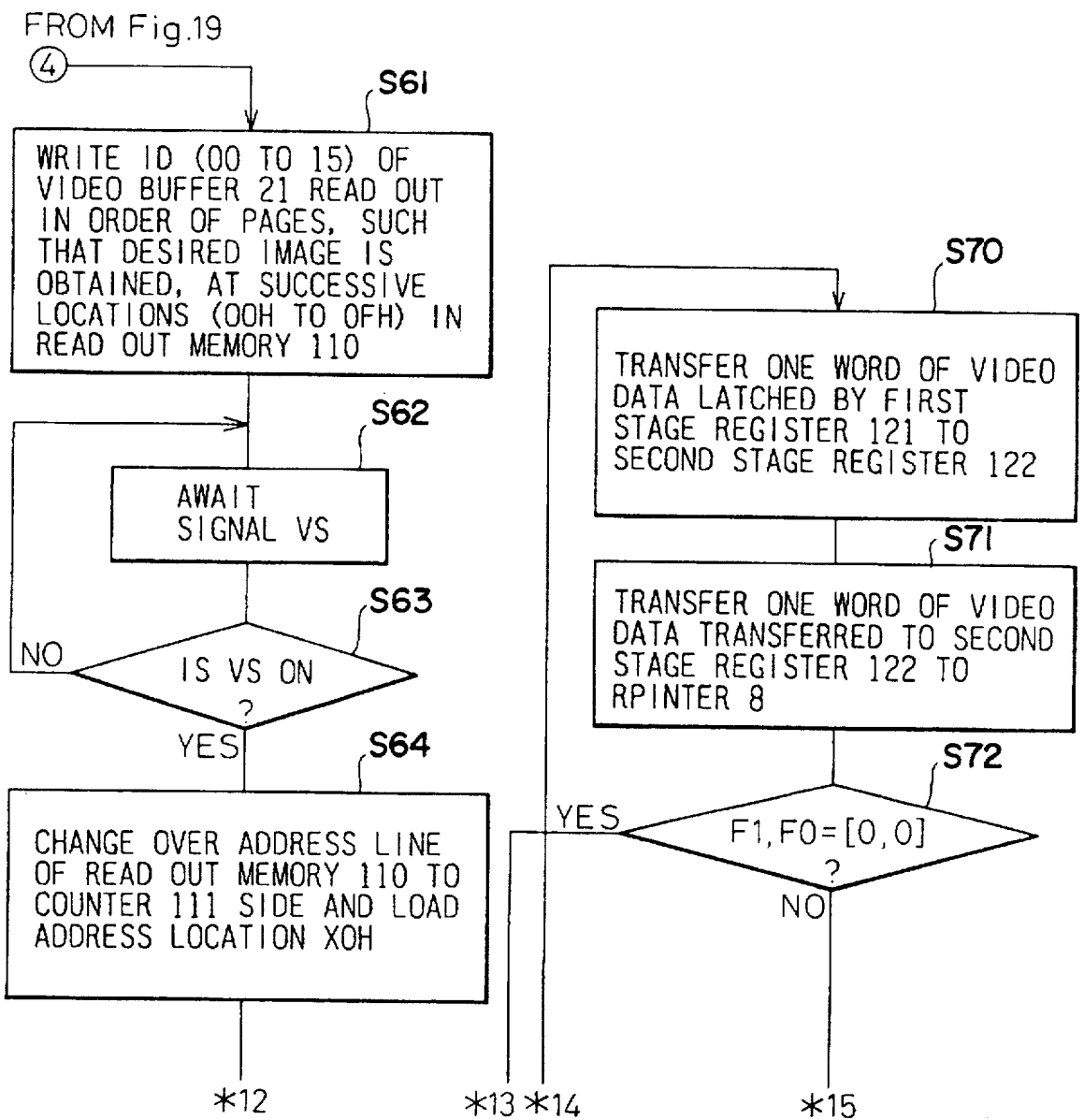
FIG. 23 and FIG. 24 are partial flow charts of a data transfer operation in a route branched from a step S22 of FIG. 19.
Figure 24:
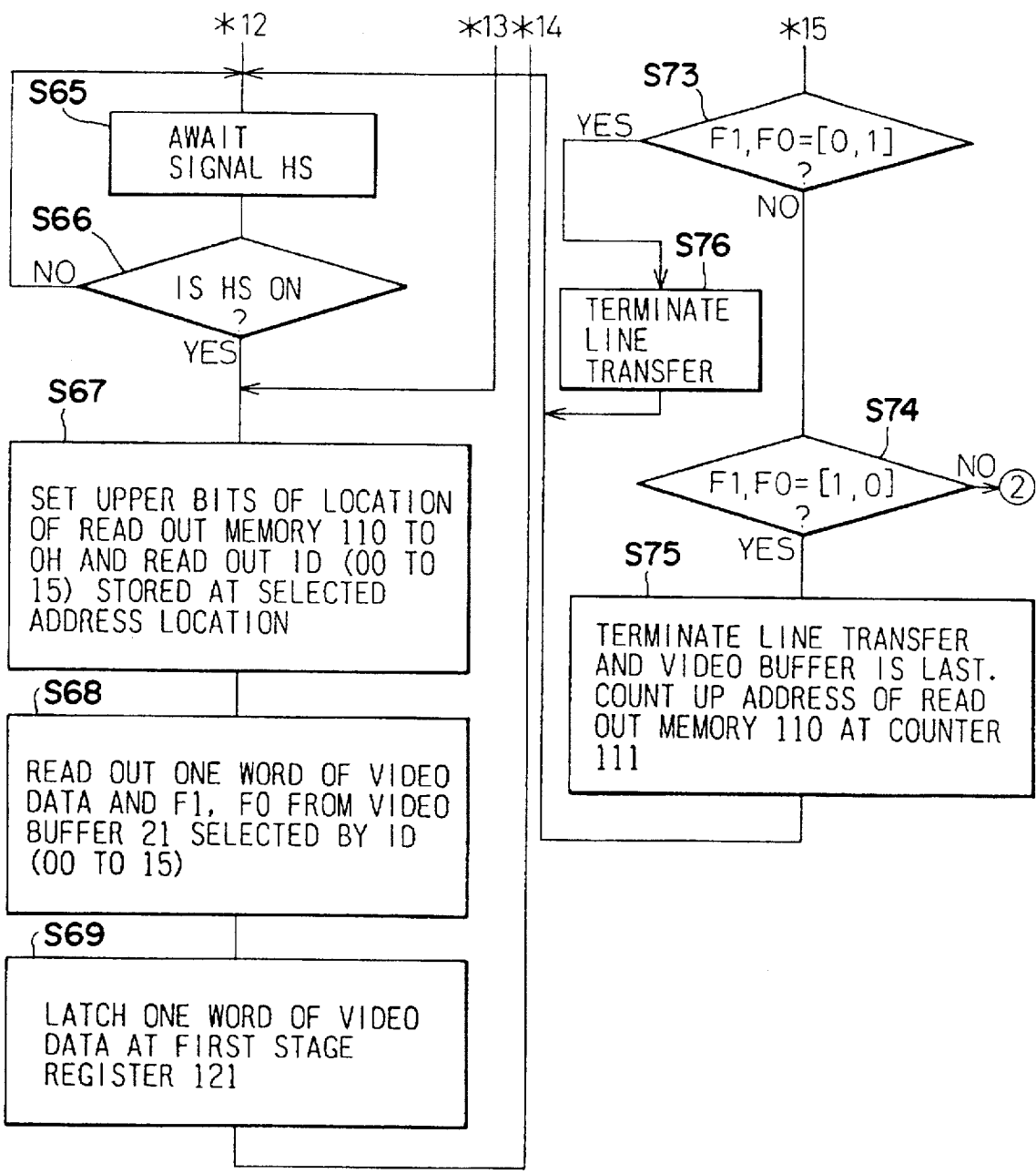
Figure 25:
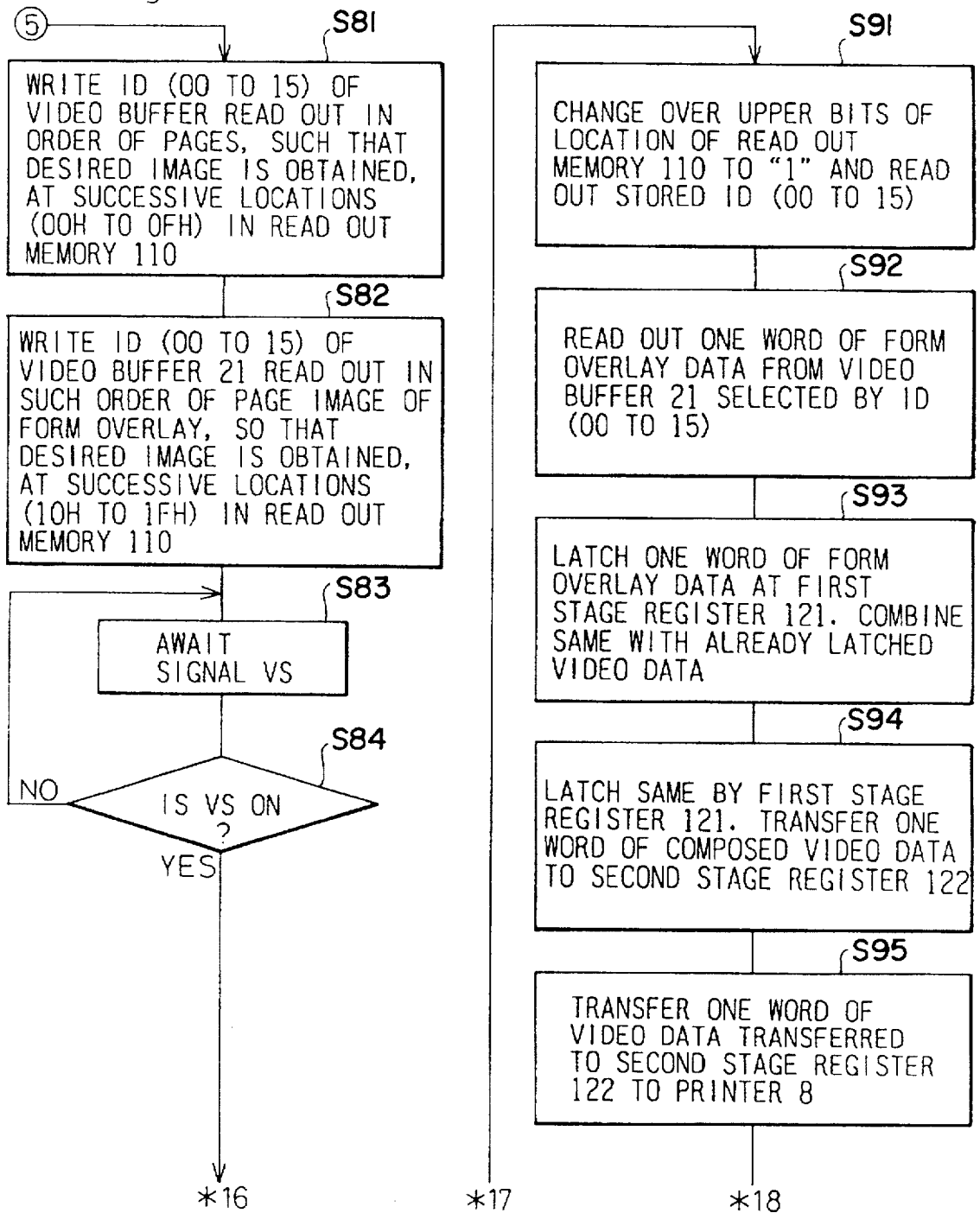
FIG. 25 and FIG. 26 are flow charts of a data transfer operation in a route branched from a step S22 of FIG. 21.
Figure 26:
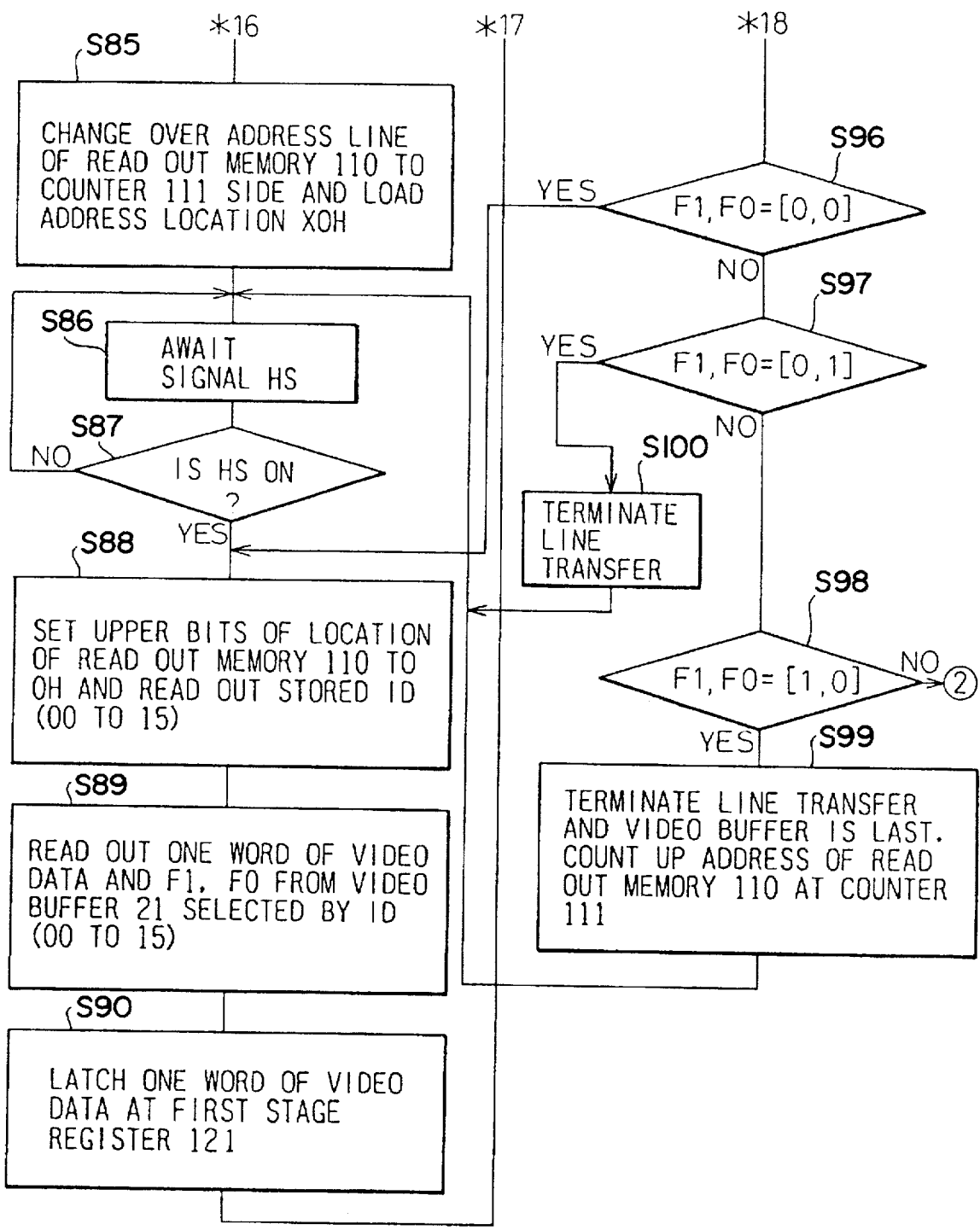

FIGS. 17 and 18 are flow charts of the data transfer operation from the bit map memory to the video buffer; FIGS. 19 and 20 are flow charts of the data transfer operation from the video buffer to the printer; FIGS. 21 and 22 are flow charts of the data transfer operation in a route branched from step S21 of FIG. 19; FIGS. 23 and 24 are flow charts of the data transfer operation in a route branched from step S22 of FIG. 19; and FIGS. 25 and 26 are flow charts of the data transfer operation in a route branched from step S41 of FIG. 21.

Note that, in the respective figures, the contents of step 1 (S1, S21, S41, S61, S81), step 2 (S2, S22, S42, S62, S82), step 3 (S3, S23, S43, S63, S83), . . . are as described in detail in the figures.

In the operation of FIG. 17 and FIG. 18, the video data is transferred from the bit map memory 22 with respect to the ID of the video buffer 21 designated by the CPU 1. This transfer is autonomously carried out by the flyby transfer unit 13 according to the control data from the CPU 1, shown in FIG. 9 and FIG. 10.

In the operation of FIG. 19 and FIG. 20, the video data stored in the video buffer 21 by the operation of FIG. 17 and FIG. 18 is sequentially read out onto the printer 8 in an order of the ID's designated on the read-out memory 110. This operation is carried out by the part of FIG. 12 and FIG. 13 already shown. The vertical synchronizing signal VS and horizontal synchronizing signal HS at steps S24 and S27 are output from the printer 8. The transfer control to the printer 8 is autonomously carried out according to the control flags F1 and F0 corresponding to the control data A30 and A29 (steps S30, S34, S35, and S36).

The operation of FIGS. 19 and 20 concerns a case where the form overlay is not included in the image to be printed by the printer 8 (result of step S21 is NO), and that image is printed on a sheet of A4 size or a smaller size (result of step S22 is NO).

The operation where the form overlay is included in the image to be printed by the printer 8 (result of step S21 of FIG. 19 is YES) and that image is printed on a sheet of A4 size or a smaller size (result of step S22 of FIG. 19 is NO) will be shown in FIGS. 21 and 22.

Further, the operation where the form overlay is not included in the image to be printed by the printer 8 (result of step S21 of FIG. 19 is NO) and that image is printed on a sheet of A4 size or a larger size (result of step S22 of FIG. 19 is YES) will be shown in FIGS. 23 and 24.

The operation where the form overlay is included in the image to be printed by the printer 8 (result of step S21 of FIG. 19 is YES) and that image is printed on a sheet of A4 size or a larger size (result of step S41 of FIG. 21 is YES) will be shown in FIGS. 25 and 26.

Figure 27:
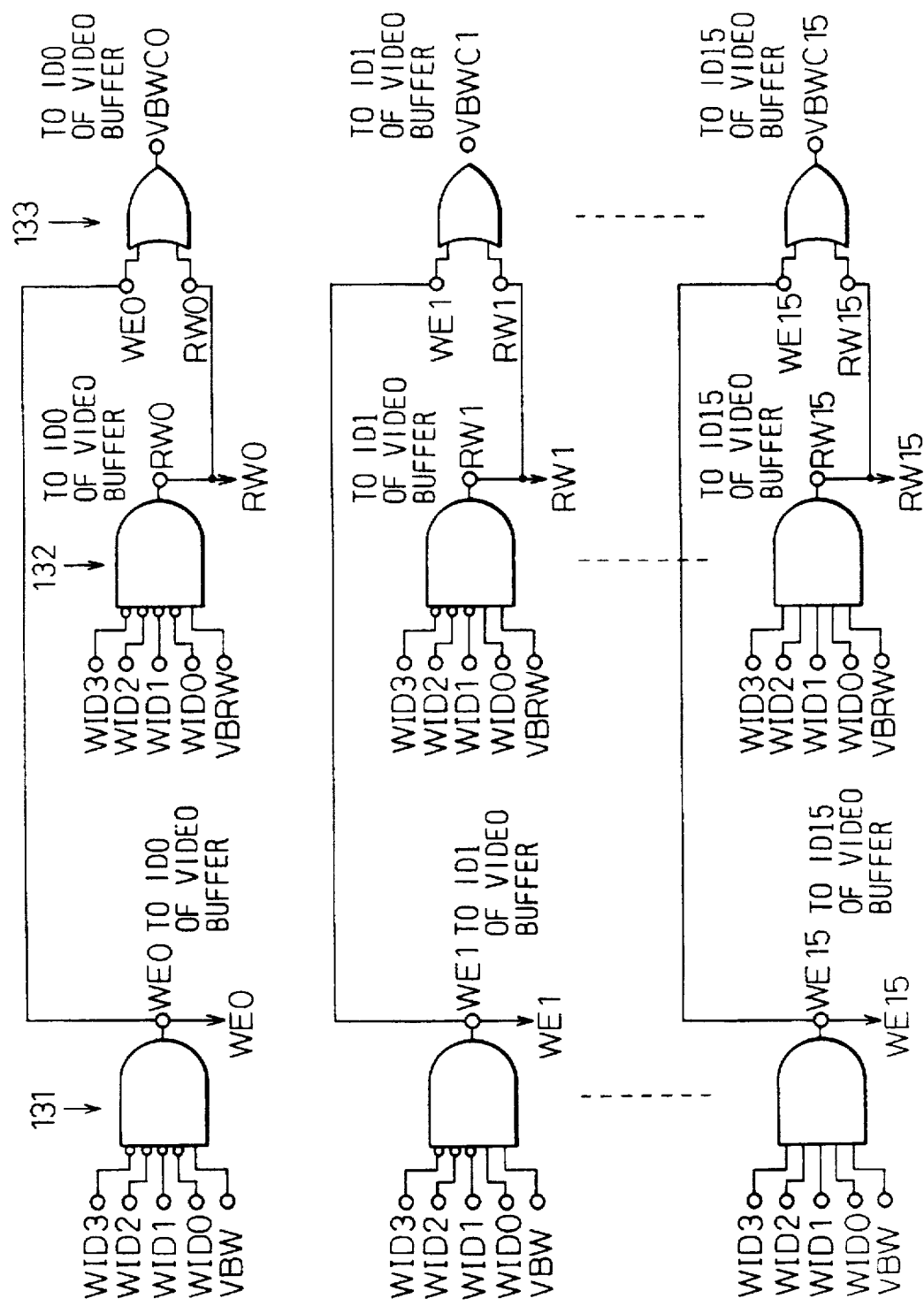
FIG. 27 is a schematic circuit diagram of a buffer write control unit 115 of FIG. 11.

FIG. 27 is a circuit diagram of the buffer write control unit 115. A principal part of the buffer write control unit 115 comprises a first AND gate group 131, a second AND gate group 132, and an OR gate group 133. The meanings of the signals indicated are as follows:

WIDO-3: Write ID to the buffer write control unit 115;

WEO-15: Write enable to individual video buffers 21;

RWO-15: Reset write pointer to individual video buffers 21;

VBWCO-15: Write clock to individual video buffers;

VBW: Video buffer write clock to the buffer write control unit 115;

VBRW: Video buffer reset write pointer to the buffer write control unit 115.

WIDO-3 is output data from the write ID register 114 to the buffer write control unit 115 of which one example is shown in FIG. 28. WEO-15 is a write enable signal given to the respective pages (ID) of the video buffer 21. RWO-15 is a clock first resetting the write address pointer in the video buffer 21 when performing the writing on respective pages of the video buffer 21. VBWCO-15 is a write clock given to the respective pages (ID) of the video buffer 21. VBW is a write clock given to the video buffer 21. VBRW is a signal indicating the above-described reset from the CPU 1 and is an original signal of the RWO-15. The above-described RWO-15 is obtained by decoding this.

FIG. 28 is a table of input data given to the circuit of FIG. 27. An example of correspondence between the above-described WIDO-3 and respective ID's is shown.

Figure 29:
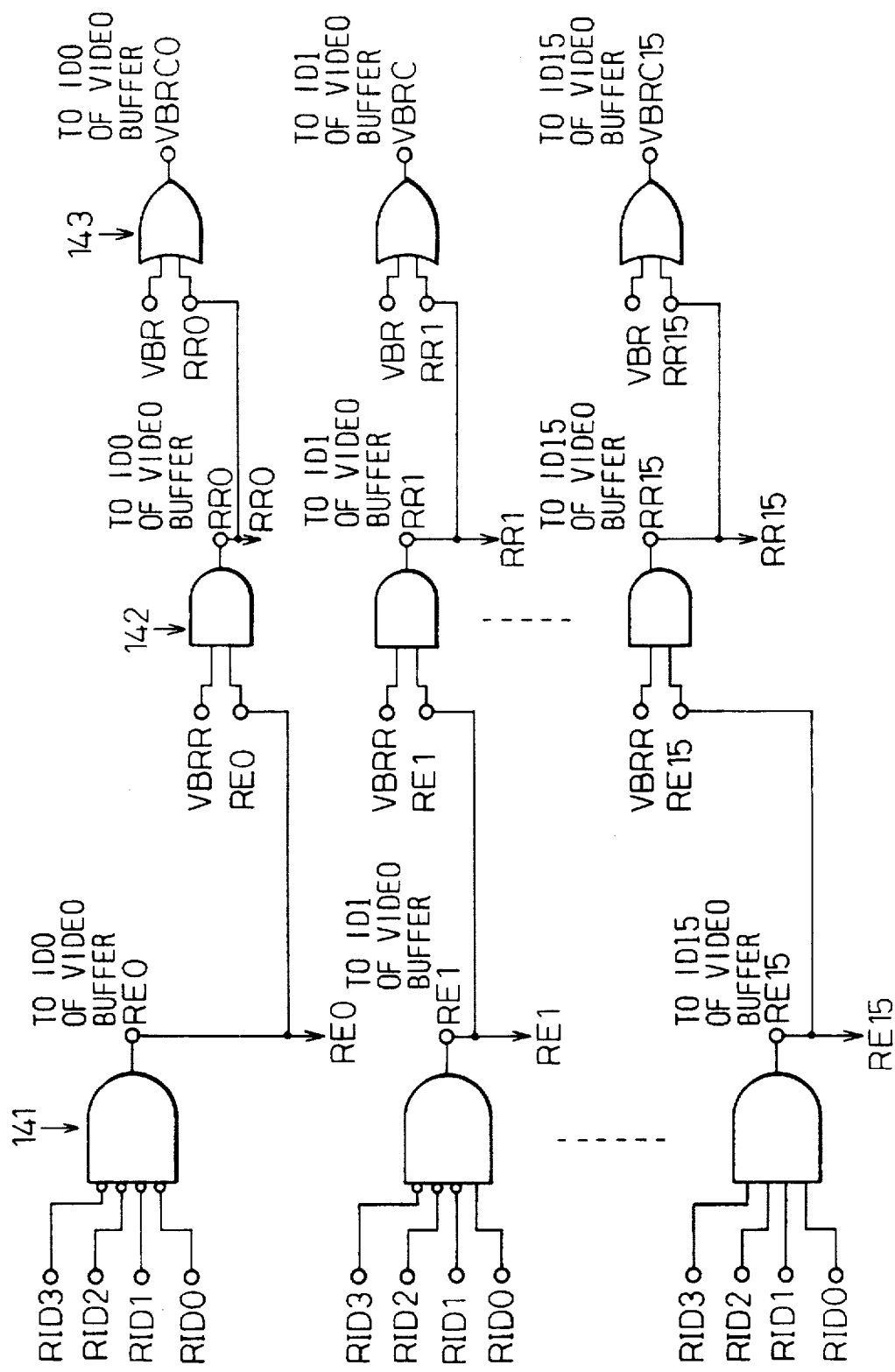
FIG. 29 is a schematic circuit diagram of a buffer read control unit 113 of FIG. 6.

FIG. 29 is a schematic circuit diagram of the buffer read control unit 113. A principal part of the buffer read control unit 113 comprises a first AND gate group 141, a second AND gate group 142, and an OR gate group 143. The meanings of the signals shown are as follows:

RIDO-15: Read ID to the buffer read control unit 113;

RRO-15: Reset read pointer to individual video buffers 21;

REO-15: Read enable to individual video buffers 21;

VBRCO-15: Read clock to individual video buffers 21;

VBR: Video buffer read clock to the buffer read control unit 113;

VBRR: Video buffer read reset pointer to the buffer read control unit 113.

RIDO-3 is output data from the read-out memory 110 to the buffer read control unit 113, of which one example is shown in FIG. 30. REO-15 is a read enable signal given to the respective pages (ID) of the video buffer 21. REO-15 is a clock first resetting the read address pointer in the video buffer 21 when performing the read out from the respective pages of the video buffer 21. VBRCO-15 is a read clock given to the respective pages (ID) of the video buffer 21. VBR is a read clock given to the video buffer 21. VBRR is a signal indicating the above-described reset from the CPU 1 and is an original signal of RRO-15. The above-described RRO-15 is obtained by decoding this.

FIG. 30 is a table of input data given to the circuit of FIG. 29. It shows an example of correspondence between the above-described RIDO-3 and respective IDts.

Figure 31:
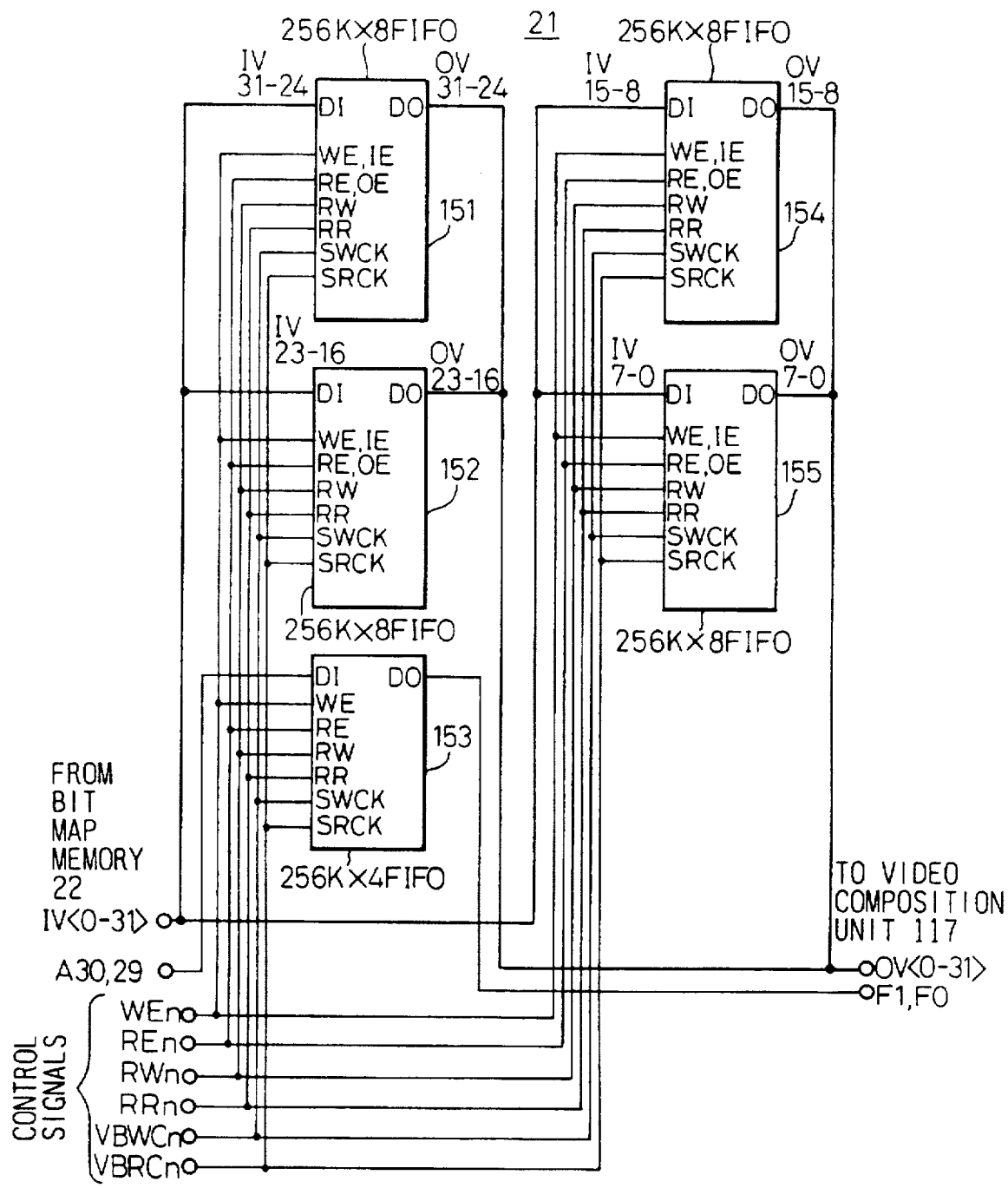
FIG. 31 is a schematic circuit diagram of a detailed example of the video buffer 21 shown in FIG. 13.

FIG. 31 is a schematic circuit diagram of an example of the video buffer 21 shown in FIG. 13. In the figure, IV expresses IN-VIDEO, and OV expresses OUT-VIDEO. Among the five FIFO's 151, ..... FIFO 155 in the figure, FIFO's 151, 152, 154 and 155 store the video data, and FIFO 153 stores the control flags F1 and F0 by the control data A30 and 29. The present figure shows the structure for one ID in ID=0, ID=1, ..... , ID=15 in FIG. 13, and as the video buffer 21, 16 sets of memory having the structure of FIG. 31 are possessed. In FIFO, IE and OE are an "input enable 2" and an "output enable", respectively, and in the present example, WE, RE and each one pin are commonly used.

The video data (together with A30, A29) from the bit map memory 22 input from the left of the figure is written in the video buffer 21 according to the control signal and read. The read video data (together with F1, F0) is output to the video composition unit 117.

Note that, as the above-described FIFO for the video buffer, use can be made of a "video frame memory" made by Oki Electric Industry Co., Ltd.

Figure 32:
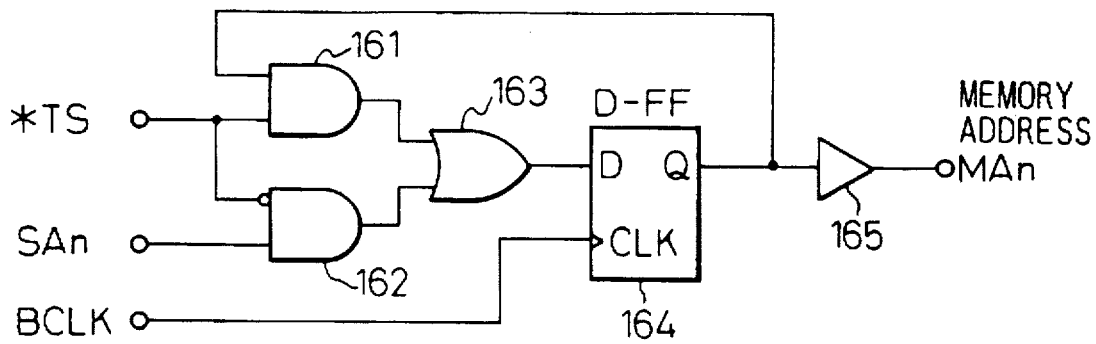
FIG. 32 is a schematic circuit diagram of an example of an address latch unit 11 of FIG. 5.

FIG. 32 is a schematic circuit diagram of an example of the address latch unit 11. A principal part of the address latch unit 11 comprises two AND gates 161 and 162, an OR gate 163, a D-flip-flop 164, and a buffer 165 as illustrated. The meanings of the signals as follows:

*TS: Bus transfer start signal of CPU 1;

SAn: system address bus SA <2-20>;

BCLK: Bus clock;

MAn: memory address MA <2-20>.

Note that, <2-20> is the number of the bit used. It is just one example.

Figure 33:
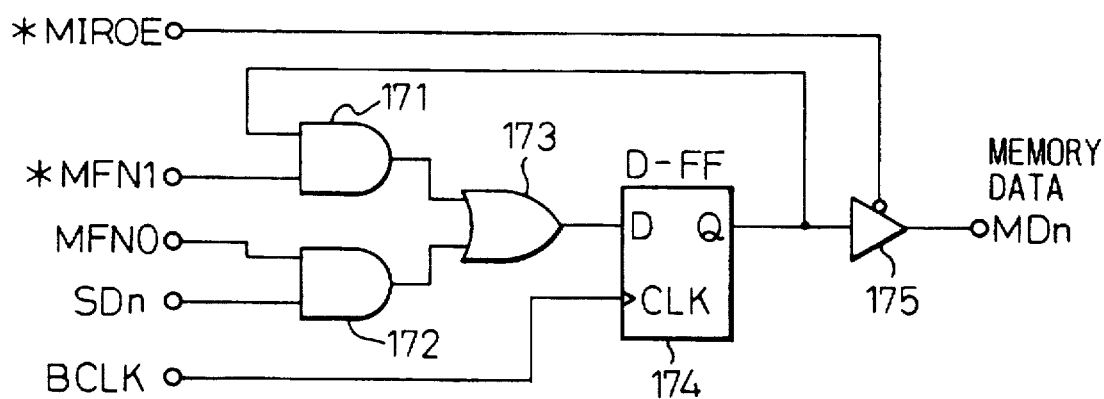
FIG. 33 is a schematic circuit diagram of an example of a data latch unit 12 of FIG. 5.

FIG. 33 is a schematic circuit diagram of an example of the data latch unit 12. A principal part of the data latch unit 12 comprises two AND gates 171 and 172, gn OR gate 173, a D-flip-flop 174, and a buffer 175 as illustrated.

Figure 34:
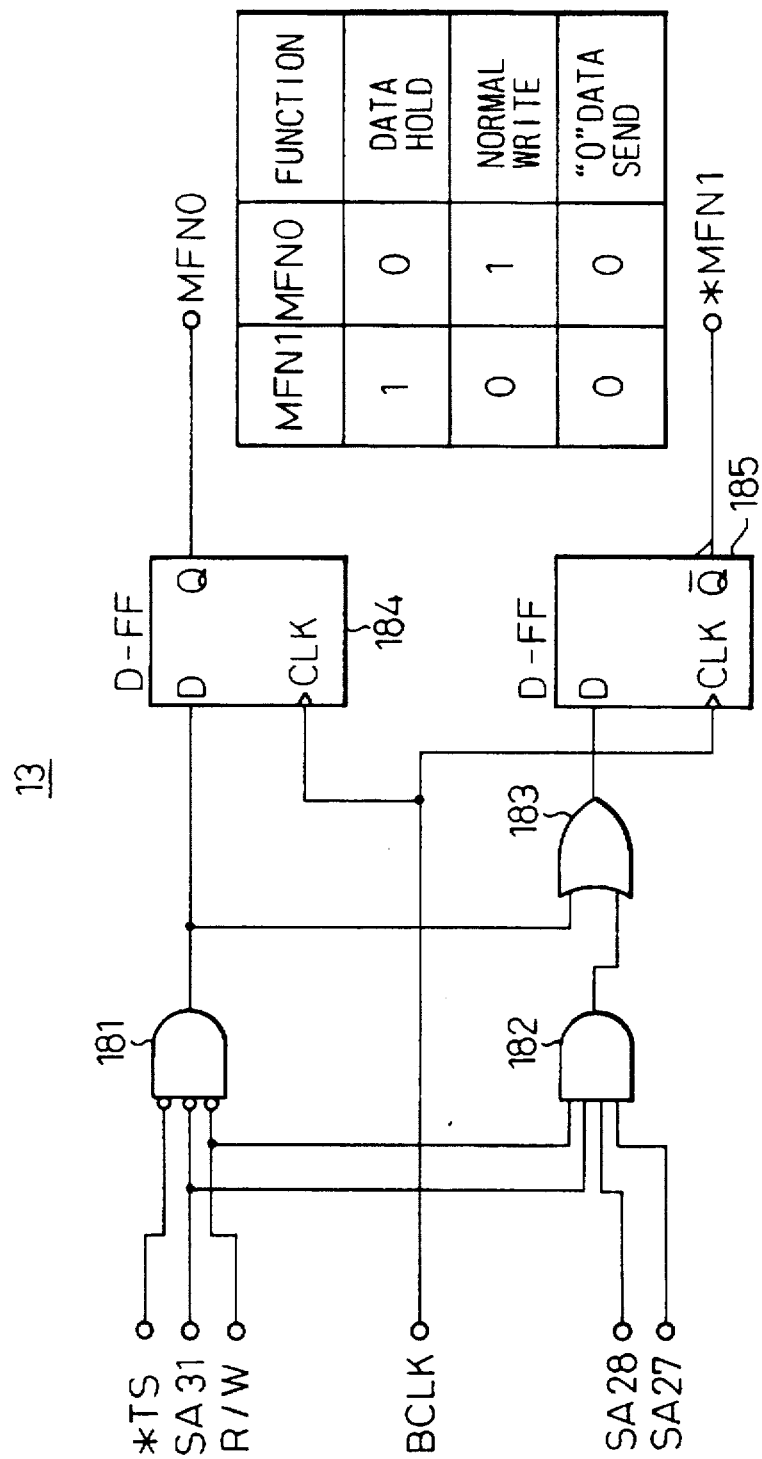
FIG. 34 is a schematic circuit diagram of a flyby transfer control unit 13 of FIG. 5.

FIG. 34 is a schematic circuit diagram of a part of the data latch unit 12 inside the flyby transfer control unit 13. The flyby control unit 13 comprises two AND gates 181 and 182, an OR gate 183, and two D-flip-flops 184 and 185 as illustrated. It is connected to the data latch unit 12 of FIG. 33 by signals MFN0 and *MFN1.

The meanings of the signals shown in FIG. 33 and FIG. 34 are as follows:

SDn: System data <0-31> (case of 32 bits);

MFN <1, 0>: Memory function code;

BCLK: Bus clock;

*MIROE: Output enable of the buffer 175;

*TS: Bus transfer start signal of CPU 1;

R/W: Read/write control signal of CPU 1;

SA <31, 28, 27>: Upper bits of address of CPU 1 (control data).

The function shown in the above-described memory function code (MFN) is shown on the right end in FIG. 34.

Figure 35:
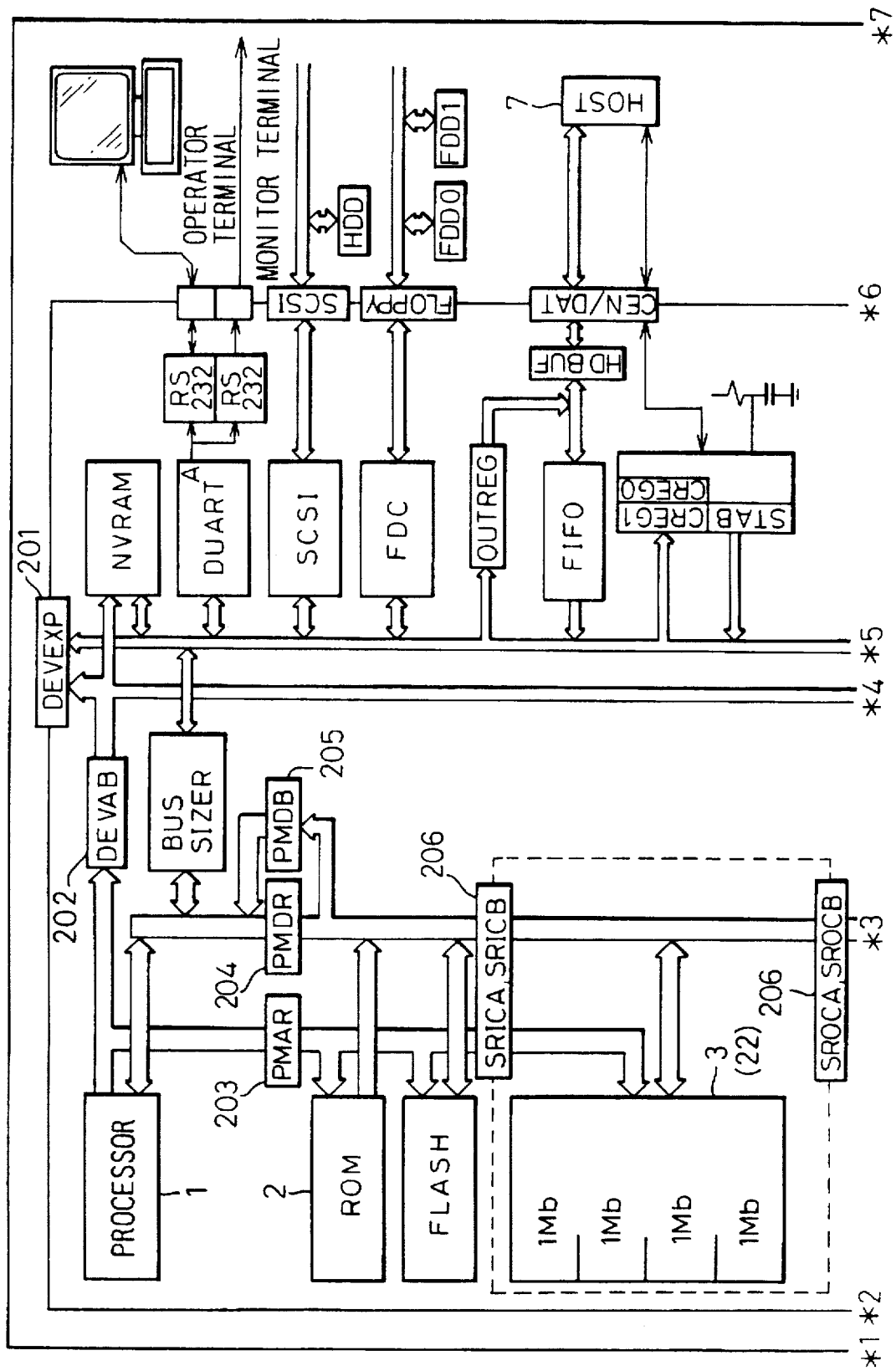
FIGS. 35 and 36 are schematic diagrams of a detailed example of a printer control apparatus embodying the present invention.
Figure 36:
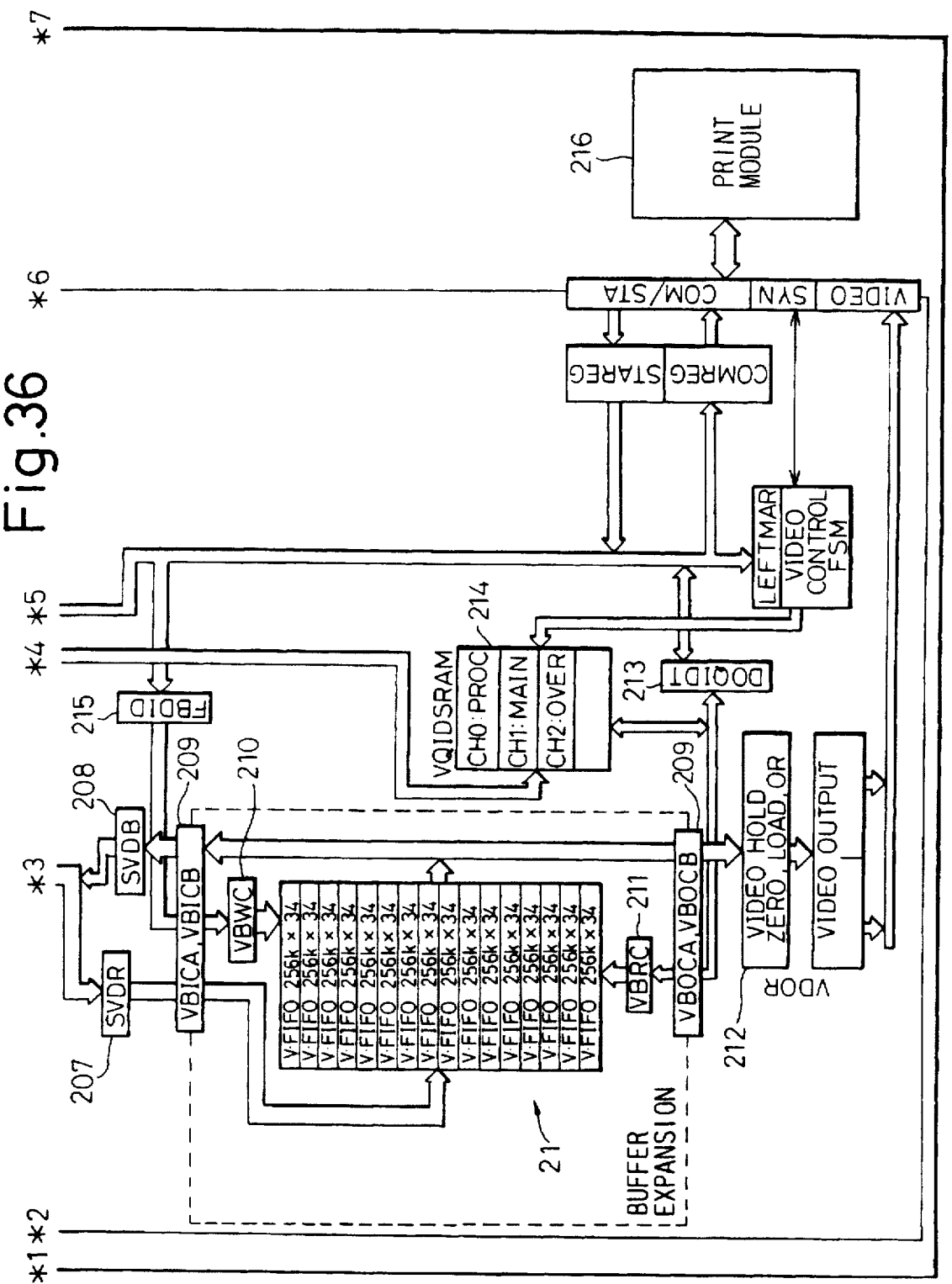

FIGS. 35 and 36 are schematic diagrams of an example of the printer control apparatus embodying the present invention. Principal constituent blocks in an actual printer control apparatus shown in the present figure are shown by attaching reference numerals 201, . . . , 215 thereto. The symbols shown with the reference numerals and the meanings thereof are as follows. Note that for already explained blocks, reference numerals which have already been used are given.

201-DEVEXP: Slots for expansion of input and output;
202-DEVAB: Device address buffer;
203-PMAR: Memory address latch (=11);
204-PMDR: Memory input data latch (=12);
205-PMDB: Memory output data buffer (=102);
206-SRICA: Slots for expansion of memory
  SRICB
  SROCA
  SROCB;
207-SVDR: Video buffer input data latch;
208-SVDB: Video buffer output data latch;
209-VBICA: Slots for expansion of video buffer
  VBICB
  VBOCA
  VBOCB;
210-VBWC: Video buffer write control unit (=115);
211-VBRC: Video buffer read control unit (=113);
212-VDOR: Video composition unit (=117);
213-DDQIDT: Read ID buffer;
214-VQIDSRAM: Read IDSRAM (Static RAM) (=110);
215-FBDID: Write ID register (=114);
216: Print module (=8).

Note that for the print module 216, a product "F6722" printer made by Fujitsu Ltd. can be used.

The operation in relation to the video buffer 21 based on the present invention will be explained in further detail.

(A) Case where one pare of A4 size is printed:

An explanation will be made with reference to FIG. 37, FIG. 38, and FIG. 39.

Figure 37:
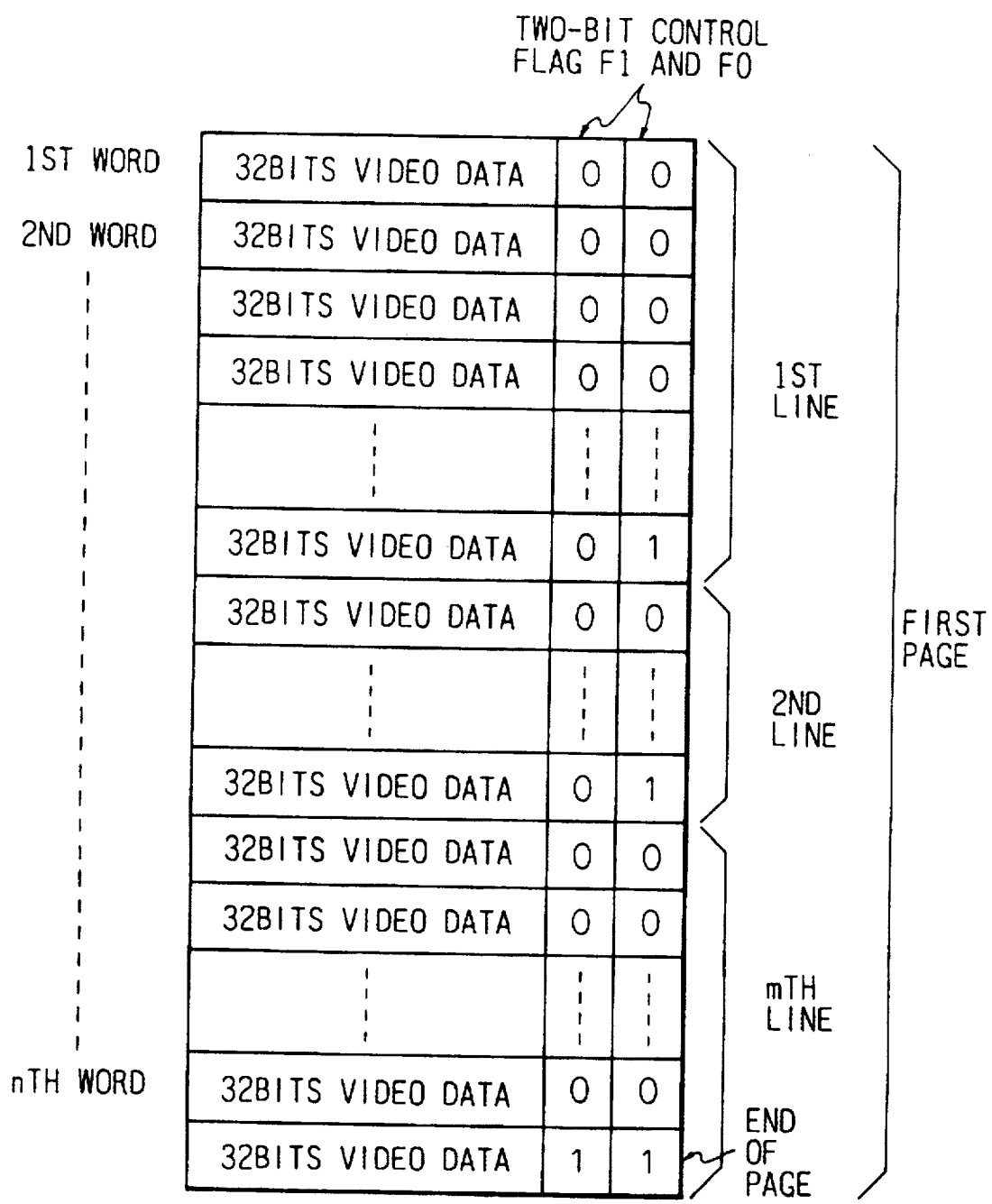
FIG. 37 is a table of an example of the data structure in a video buffer 21 used in an embodiment of the present invention.

FIG. 37 is a table of an example of the data structure in the video buffer 21; FIG. 38 is a schematic diagram used for an explanation of a read-out memory; and FIG. 39 illustrates a specific data stored in the read-out memory 110.

1) The code data from the host 7 is converted in the bit map memory 22.
2) The ID of the video buffer 21 to be transferred is set in the write ID register 114.
3) The ID is loaded from the write ID register 114 onto the buffer write control unit 115.
4) The gates of various control signals with respect to the video buffer 21 selected by the loaded write ID are opened (refer to the video buffer selection circuits of FIGS. 27 and 28).
5) The flyby transfer of data is started from the bit map memory 22.
6) (A30, A29) is set to (1, 1) at the end of page, and the transfer is terminated (refer to FIG. 37).
7) The ID of the video buffer 21 in which the page to be printed is stored is written at the address location 00H of the read-out memory 110.
8) The signals HS and VS are input from the printer 8. The address line of the read-out memory 110 is changed over to the counter 111 side, and an initial value 00H of the counter is loaded.
9) The read ID set at the location 00H of the read-out memory 110 is loaded on the buffer read control unit 113.
10) Gates with respect to various types of control signals with respect to the video buffer 21 selected by the loaded read ID are opened (refer to the video buffer selection circuits of FIGS. 29 and 30).
11) The transfer of video data is started from the video buffer 21 and the printer 8.
12) When the control flags (F1, F0)=(1, 1) are detected, the transfer is terminated, and the address line of the read out memory 110 is changed over to the system bus (SA) side.

Figure 38:
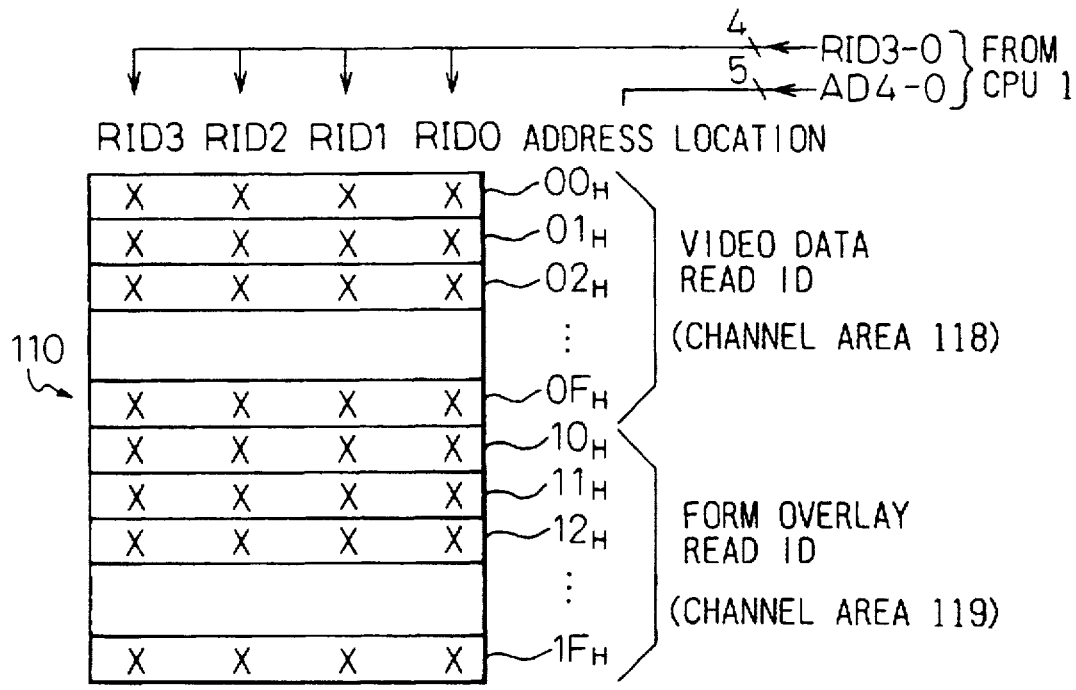
FIG. 38 is a schematic diagram used for an explanation read-out memory 110.
Figure 39:
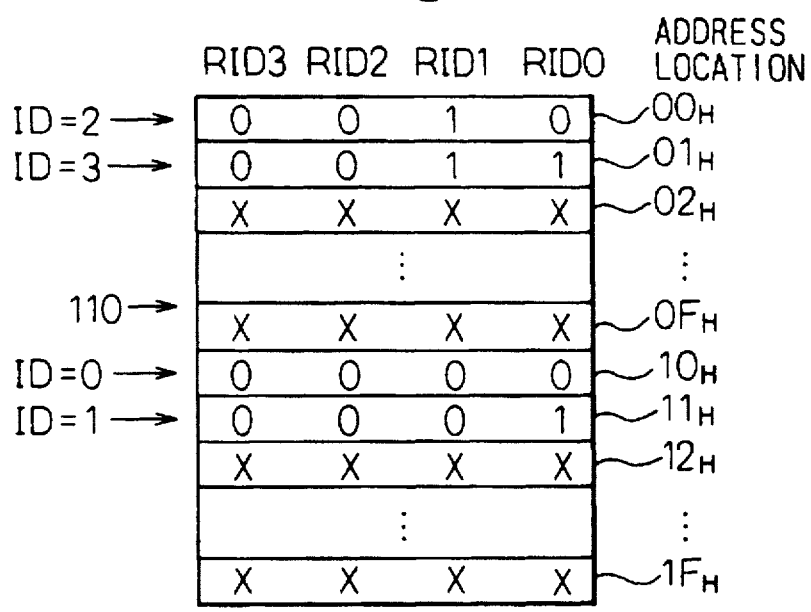
FIG. 39 illustrates a specific data stored in the read-out memory 110.

When taking as an example a case where the video data of an A3 size sheet stored at ID=2 and ID=3 of the video buffer 21 and the form overlay data of the A3 size stored at ID=0 and ID=1 are read out, the corresponding ID shown in FIG. 39 will be written with respect to the read-out memory 110 of FIG. 38.

(B) Case where one page of A3 size is printed:

Note, it is assumed that the video data is stored at ID=5 and ID=8 of the video buffer 21.

1) The code data from the host 7 is converted in the bit map memory 22 (half an A3 size page worth of data).
2) WID=(0, 1, 0, 1) (refer to FIG. 28) is set in the write ID register 110 (ID=5).
3) The ID is loaded from the write ID register 110 onto the buffer write control unit 115.
4) The gates of various types of control signals with respect to ID=5 of the video buffer 21 are opened (refer to the video buffer selection circuits of FIG. 27 and FIG. 28).
5) The flyby transfer of data is started from the bit map memory 22.
6) (A30, A29) is set to (1, 0) at the end of video buffer 21, and the transfer is terminated.
7) The code data from the host 7 is developed in the bit map memory 22 (latter half A3 size page worth of data).
8) WID=(1, 0, 0, 0) (refer to FIG. 28) is set at the write ID register 110 (ID=8).
9) The ID is loaded from the write ID register 110 onto the buffer write control unit 115.
10) The flyby transfer of data is started from the bit map memory 22.
11) A30, A29 is set to (1, 1) at the end of page, and the transfer is terminated (refer to FIG. 37).
12) RID (0, 1, 0, 1) (refer to FIG. 30) is set at the address location 00H of the read-out memory 110, and RID (1, 0, 0, 0) is set at the address location 01H of the read-out memory 110.
13) Signals HS and VS are input from the printer engine 8. The address line of the read-out memory 110 is changed over to the counter 111 side, and an initial value 00H of the counter is loaded.
14) RID (0, 1, 0, 1) set at the location 00H of the read-out memory 110 is loaded in the buffer read control unit 113.
15) The gates of various types of control signals with respect to ID=5 of the video buffer 21 are opened (refer to the video buffer selection circuits of FIGS. 29 and 30).
16) The transfer of the video data is started from the video buffer 21 to the printer engine 8.
17) When detecting the control flags (F1, F0) of (1, 0), the counter 111 is counted up, and RID (1, 0, 0, 0) set at the address location 01H is loaded in the buffer read control unit 113.
18) Gates of various control signals with respect to ID=8 of the video buffer 21 are opened (refer to the video buffer selection circuits of FIG. 29 and FIG. 30).

19) The transfer of the video data is started from the video buffer 21 to the printer 8.

20) When detecting the control flags (F1, F0) of (1, 1), the transfer is terminated. The address line of the read-out memory 110 is changed over to the system bus (SA) side.

In this way, in the printing of an A3 size sheet, two ID's of video buffers 21 are necessary, and the control flag F1, F0 of (1, 0) is written at the end of the first half page. Note that it is also possible even if the ID's of the video buffer to be written are not successive. That is, an arbitrary ID of the video buffer can be selected. Note that, it is required that the data has already been read out from that ID.

Figure 40:
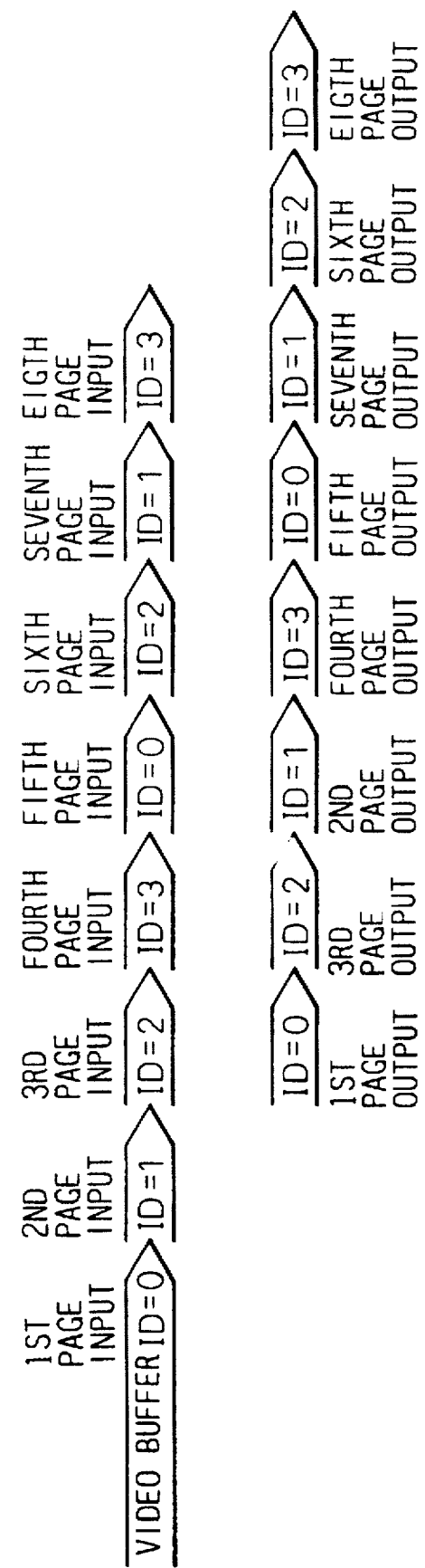
FIG. 40 is a schematic diagram illustrating a front-back printing operation.

(C) Case where front-back printing is carried out:

FIG. 40 is a diagram for explaining the control in the case of front-back printing. Two successive sheets are continuously fed into the printing path of the printer 8. In a sequence of the front-back printing, generally a first and third pages are printed, the sheet is returned by a back path, and then second and fourth pages are printed.

Referring to FIG. 40, in the top row thereof, it is assumed that the first page input, second page input, . . . , are stored at for example ID=0, ID=1, . . . of the video buffer. In this, at the time of printing, the video data (printing data) is read out in the manner of the first page output (ID=0)→third page output (ID=2)→second page output (ID=1)→fourth page output (ID=3)→, whereby the front-back printing of the first to fourth pages is completed.

Thereafter, the read out operation is continued in the manner of the fifth page output (ID=0)→seventh page output (ID=1)→, . . . Note that, the reason why the fifth page output and seventh page output are read out from ID=0 and ID=1 is because the ID=0 and ID=1 have already become empty, and the video data of the fifth and seventh pages is written utilizing them. If the first page (ID=0) were a fixed data like the form overlay and there were a possibility that it would be repeatedly used many times, the fifth page worth of the data would not be stored at ID=0, but stored at for example ID=4.

In embodiments of the present invention, the data setup time of the memory can be ensured with a sufficient margin without the need for insertion of a wait cycle as in a previously-considered apparatus, and the read-after-write operation at the same address, with respect to the same memory, can be completed in the first half of one bus cycle. For this reason, an increase in speed of the printer can be achieved.

Further, by making the upper bits of an address from the CPU contain the control data, flyby control without going through the CPU becomes possible, and the load on the CPU at the time of data transfer can be reduced. Accordingly, the CPU can be enabled to perform the processing of classification thereof, and therefore an increase in speed as a whole of a printer can be achieved.

Furthermore, it is possible to constitute the video buffer by several pages (for example, 16 pages), store the video data in an optional page, and, at the same time, read out the video data from that optional page, and therefore also printing including the form overlay data, front-back printing, etc. can be coped with without unduly complex control. According to a previously-considered printer control apparatus (FIG. 1), the CPU 1 operates to detect an end of line and an end of page using a counter, compare the detected count with predetermined various counts, and change the line or page whenever they coincide with each other, while updating the leading address of the RAM 3. Accordingly, the load of the CPU 1 becomes very heavy, and therefore a high speed printer could not be easily realized.

However, in an embodiment of the present invention, a read-out memory (ID storage register) of the present invention can be introduced, and the video data can be autonomously read out at a high speed continuously from a video buffer 21 having ID's of several pages, avoiding a need for the CPU 1 to be involved in the continuous read out of the video data. Consequently the load on the CPU 1 becomes light, and the CPU 1 can do just the work for the conversion of the image data, etc. Therefore, the amount of data processing per unit time can be greatly increased for the printer as a whole.

We claim:

1. Data processing apparatus, comprising:

a memory;

a bus;

a central processing unit interconnected with said memory via said bus and operable, in synchrony with successive bus cycles of the apparatus, to convert successive blocks of input data, supplied to the apparatus in a first form, to respective blocks of operative data of a second form to be stored in said memory;

a data latch unit connected with said bus, for retaining such a block of operative data temporarily; and an address latch unit, connected with said bus, for retaining temporarily an address at which said block of operative data held by said data latch unit is to be stored in said memory, and in that operation of the apparatus involves delivery of such a block of operative data to the bus, by said central processing unit, in the second half of one bus cycle, retention of that block of operative data by said data latch unit for a period of time during the first half of the next bus cycle, and writing of that block of operative data in the said memory during the said period of time at an address retained during that period in said address latch unit.

2. A printer control apparatus, comprising:

a central processing unit which performs processing for converting video data supplied from an external unit and to be printed to video data tailored to operation of a printer in synchronization with respective bus cycles;

a memory which temporarily holds data during the conversion processing of the video data; and a read/write controller which controls read/write operation of the video data between the printer, the central processing unit, and the memory, the read/write controller includes an address latch unit which temporarily holds an address of said video data when the video data is transferred from the central processing unit to the memory and a data latch unit which temporarily holds said video data to be transferred, wherein the read/write controller writes the related video data in the related address of the memory in a first half of a second bus cycle appearing immediately after a first bus cycle based on said video data given in a second half of the first bus cycle and the address thereof.

3. A printer control apparatus according to claim 2, wherein the latching of the aforesaid address to the aforesaid address latch unit is carried out at a timing at which a transfer start signal is output from the aforesaid central processing unit during a bus cycle of the aforesaid first bus cycle; latching of the aforesaid video data to the aforesaid data latch unit is carried out at a time of ending of the aforesaid first bus cycle at a timing at which a transfer acknowledge is returned from the aforesaid read/write control means to the central processing unit; and both the latching of the aforesaid address in the aforesaid address latch unit and latching of the aforesaid video data at the aforesaid data latch unit are released at a timing at which the aforesaid transfer start signal is output during the aforesaid second bus cycle.

4. A printer control apparatus according to claim 2, wherein the read/write controller functions for outputting clear data for erasing the video data which has been already written and completes, in one bus cycle, the clear data achieved in a first half of a second bus cycle, a write-after-read operation of quickly performing the writing of clear data immediately after the read out of said video data while latching the address in the address latch unit as it is when said clear data is written at the same address after the video data is read out from the predetermined address in the memory.

5. A printer control apparatus according to claim 4, wherein the latching of the aforesaid address at the aforesaid address latch unit is carried out at a timing at which the transfer start signal is output from the aforesaid central processing unit during the aforesaid first bus cycle; the latching of the aforesaid clear data at the aforesaid data latch unit is carried out at the time of ending of the aforesaid first bus cycle and at a timing at which the transfer acknowledge signal is returned from the aforesaid read/write control means to the central processing unit; and both of the latching of the aforesaid address in the aforesaid address latch unit and latching of the aforesaid video data at the aforesaid data latch unit are released at a timing at which the aforesaid transfer start signal is output during the aforesaid second bus cycle.

6. A printer control apparatus according to claim 5, wherein the read out of the aforesaid video data is carried out when the memory out enable signal is applied to the aforesaid memory means; the subsequent writing of the aforesaid clear data in said memory means is carried out when a memory write signal is applied to said memory means and the clear data send signal is applied to the aforesaid data latch unit and, at the same time, said memory write signal and said clear data send signal are all generated in the first half of one bus cycle.

7. Data processing apparatus, comprising:
   a memory,
   a bus, and
   a central processing unit interconnected with said memory via said bus and operable, in synchrony with successive bus cycles of the apparatus, to convert successive blocks of input data, supplied to the apparatus in a first form, to respective blocks of operative data of a second form to be stored in said memory at respective addresses supplied by said central processing unit, said bus are also connected with a flyby control unit and a buffer memory, said flyby control unit being operable to transfer data between said memory and said buffer memory directly and synchronously with a CPU cycle, without entering data into the central processing unit.

8. A printer control apparatus for a printer, comprising:
   a central processing unit which performs processing for converting video data supplied from an external unit and to be printed to video data tailored to the operation of the printer in synchronization with respective bus cycles;
   a memory which temporarily holds the data during the conversion processing of the video data; and
   a read/write controller which controls the read/write operation of the video data between the printer, the central processing unit, and the memory, the read/write controller including a flyby transfer control unit, said flyby transfer control unit receives the control data written in several upper bits of an address from the central processing unit, and autonomously performs the read/write operation of the video data between the printer, the central processing unit, and the memory in accordance with the content of control of said control data without using said central processing unit.

9. A printer control apparatus according to claim 8, wherein: the content of control of the control data written in the several upper bits of the aforesaid address includes at least one of: a normal read indication indicating a usual read operation from the aforesaid read/write control means to the aforesaid central processing unit; a normal write indication indicating a usual write operation from the aforesaid central processing unit to the aforesaid read/write control means; a flyby read indication indicating the read operation from a bit map memory constituting a part of the aforesaid memory means and storing the aforesaid video data in the form of the data of a dot image to a video buffer constituting another part of said memory means and storing the aforesaid video data which should be output to the aforesaid printer; a flyby write indication indicating the write operation from the aforesaid video buffer to the aforesaid bit map memory; and a flyby read modify write indication indicating the operation of writing the clear data for erasing the aforesaid video data which has been already written in said bit map memory immediately after performing the read out of the aforesaid video data from the aforesaid bit map memory to the aforesaid video buffer.

10. A printer control apparatus according to claim 9 wherein the control content of the control data written in the several upper bits of the aforesaid address includes the control indication added in the form of control flags for each of the words constituting the aforesaid video data in the aforesaid video buffer; said control flags including at least one of: a flag indicating that the transfer of the aforesaid video data should be continued; a flag indicating that the aforesaid video data should wait for an arrival of a horizontal synchronizing signal from said printer at the end of one line on the aforesaid printer; a flag indicating that the aforesaid video data corresponds to the end of one line on the aforesaid printer and corresponds to the end of one page worth of data of the aforesaid video buffer, and accordingly said page should be renewed; a flag indicating that the aforesaid video data corresponds to the end of one line on the aforesaid printer and corresponds to the end of the aforesaid page and accordingly the transfer of said video data should be terminated.

11. A printer control apparatus for a printer comprising:
   a central processing unit which performs processing for converting video data supplied from an external unit and to be printed to video data tailored to the operation of the printer in synchronization with respective bus cycles;
   a memory which temporarily holds the data during the conversion processing of the video data; and
   a read/write controller which controls the read/write operation of the video data between the printer, the central processing unit, and the memory,
   wherein said memory includes a video buffer which stores the video data converted to the data of a dot image by the central processing unit and outputs the same to the printer, said video buffer capable of storing a plurality of FIFO blocks each corresponding in capacity to a standard page size and comprising a memory able to store several standard size pages, a standard page size being allotted to one FIFO block, and the video data converted to the data of the dot image stored in said respective pages in unit of words.

12. A printer control apparatus according to claim 11, wherein: the memory includes a bit map memory which sequentially and temporarily develops the video data converted to the data of the dot image by the central processing unit in the bit map, and the read/write controller includes a write control unit and a read control unit; and the writing of the video data from the bit map memory to the video buffer is carried out by said write control unit, and the read out of said video data to the printer is carried out by the read control unit and an ID is allocated to each FIFO block and the read/write controller carries out control based on the ID's.

13. A printer control apparatus for a printer, comprising:
a central processing unit which performs processing for converting video data supplied from an external unit and to be printed to video data tailored to the operation of the printer in synchronization with respective bus cycles;
a memory means which temporarily holds data during the conversion processing of the aforesaid video data, and a read/write control means which controls the read/write operation of the video data between the printer, the central processing unit, and the memory means,
wherein said memory means includes a video buffer which stores the video data converted to the data of a dot image by the central processing unit and outputs the same to the printer; said video buffer comprises a memory able to store several standard size pages and the video data converted to the data of the dot image is stored in said respective pages in unit of words wherein: the memory means includes a bit map memory which sequentially and temporarily develops the video data converted to the data of the dot image by the central processing unit in the bit map, and the read/write control means includes a write control unit and a read control unit; and the writing of the video data from the bit map memory to the video buffer is carried out by said write control unit, and the read out of said video data to the printer is carried out by the read control unit,
wherein the control content of the control data written in the several upper bits of an address from the central processing unit includes the control indication added in the form of control flags to each of the words constituting the video data written in the video buffer, and
wherein the read control unit performs the transfer control between said video buffer and the printer according to the indication by said control flag for every word described before.

14. A printer control apparatus according to claim 11, wherein the video buffer is constituted by a DRAM type FIFO memory, the FIFO memory achieving asynchronous read/write operations without requiring an RAS control, a CAS control, a refresh control and addresses.

15. A printer control apparatus for a printer, comprising:
a central processing unit which performs processing for converting video data supplied from an external unit and to be printed to video data tailored to operation of the printer in synchronization with respective bus cycles;
a memory means which temporarily holds the data during a conversion processing of the video data; and
a read/write control means which controls the read/write operation of the video data between the printer, the central processing unit, and the memory means, wherein said memory means includes a video buffer which stores the video data converted to the data of a dot image by the central processing unit and outputs the same to the printer;
wherein said video buffer comprising a memory able to store several standard size pages and the video data converted to the data of the dot image is stored in said respective pages in unit of words, and
wherein the central processing unit selects which page among the several pages constituting the video buffer the video data should be written on by an ID allotted to each page and the memory means has a write ID register storing said selected ID.

16. A printer control apparatus according to claim 15, wherein the aforesaid read/write control means has a buffer write control unit which selects one or more pages corresponding to certain ID's among the aforesaid several pages based on the aforesaid ID's in the aforesaid write ID register.

17. A printer control apparatus for a printer, comprising:
a central processing unit which performs processing for converting video data supplied from an external unit and to be printed to video data tailored to the operation of the printer in synchronization with respective bus cycles;
a memory means which temporarily holds the data during the conversion processing of the video data; and
a read/write control means which controls the read/write operation of the video data between the printer, the central processing unit, and the memory means,
wherein said memory means includes a video buffer which stores the video data converted to the data of a dot image by the central processing unit and outputs the same to the printer;
wherein said video buffer comprises a memory able to store several standard size pages and the video data converted to the data of the dot image is stored in said respective pages in unit of words, and
wherein the central processing unit designates which page, among the several pages constituting the video buffer, the video data should be read out from by the ID's allotted for each page and the memory means has a read-out memory storing said ID designated.

18. A printer control apparatus according to claim 17, wherein the aforesaid read-out memory is constituted by dividing it into a video data channel area which holds ID's corresponding to the pages on which usual video data is stored among the aforesaid pages in the aforesaid video buffer and a form overlay channel area holding ID's corresponding to the pages on which the form overlays are stored among the aforesaid pages in the aforesaid video buffer.

19. A printer control apparatus according to claim 18, wherein the aforesaid read/write control means combines the data of the aforesaid page corresponding to the aforesaid ID read out from the aforesaid video data channel area and the data of the aforesaid page corresponding to the aforesaid ID read out from the aforesaid form overlay channel area and outputs the result to the aforesaid printer.

20. A printer control apparatus according to claim 19, further comprising a video composition unit having a first register and a second register, in said first stage register, the data of the page corresponding to the certain ID read out from the video data channel area is held for each word described before, and the data of the page corresponding to the ID read out from the form overlay channel area and the data of the video data channel which was held are combined, and in the second stage register, the composition data from the first stage register is copied and output to the printer and, at the same time, and said first stage register starts the composition processing of the subsequently appearing next word.

21. A printer control apparatus according to claim 17, wherein the aforesaid read/write control means has a buffer read control unit which selects a page corresponding to a certain ID among the aforesaid several pages based on the aforesaid ID's in the aforesaid read/write memory.

22. A method of printer control which transfers video data supplied from an external unit to a video data memory where such video data can then be output to a printer, comprising:

(a) writing the video data supplied from the external unit temporarily into a data latch;

(b) writing an address of said video data temporarily into an address latch;

(c) delivery of said video data to a bus during a second half of a first bus cycle;

(d) retention of said video data in said data latch for a period of time during the first half of a second bus cycle, the second bus cycle immediately following the first bus cycle; and (e) writing said video data into said video data memory at said address stored in said address latch during the first half of the second bus cycle.

23. A method of printer control, comprising:

(a) writing an address of video data during a second half of a first bus cycle; and (b) writing said video data into a memory during a first half of a second bus cycle.

* * * * *

UNITED STATES PATENT AND TRADEMARK OFFICE
CERTIFICATE OF CORRECTION

PATENT NO. : 5,787,240
DATED : July 28, 1998
INVENTOR(S) : Igor HANSEN et al.

It is certified that error appears in the above-indentified patent and that said Letters Patent is hereby corrected as shown below:

Col. 2,  line 65, change "S22" to --S41--.

Col. 14, line 43, change "gn" to --an--.

Signed and Sealed this

Second Day of February, 1999

Attest:

Attesting Officer

*Acting Commissioner of Patents and Trademarks*